(12) United States Patent
Ferguson et al.

(10) Patent No.: US 11,574,352 B2
(45) Date of Patent: Feb. 7, 2023

(54) SYSTEMS AND METHODS FOR RETURN LOGISTICS FOR MERCHANDISE VIA AUTONOMOUS VEHICLE

(71) Applicant: Nuro, Inc., Mountain View, CA (US)

(72) Inventors: David Ferguson, San Francisco, CA (US); Jiajun Zhu, Palo Alto, CA (US); Cosimo Leipold, Washington, DC (US); Pichayut Jirapinyo, San Francisco, CA (US)

(73) Assignee: NURO, INC., Mountain View, CA (US)

( * ) Notice: Subject to any disclaimer, the term of this patent is extended or adjusted under 35 U.S.C. 154(b) by 231 days.

(21) Appl. No.: 16/181,724

(22) Filed: Nov. 6, 2018

(65) Prior Publication Data
US 2019/0073631 A1  Mar. 7, 2019

Related U.S. Application Data

(63) Continuation-in-part of application No. PCT/US2018/044361, filed on Jul. 30, 2018.
(Continued)

(51) Int. Cl.
*B65G 67/24* (2006.01)
*G05D 1/12* (2006.01)
(Continued)

(52) U.S. Cl.
CPC ............ *G06Q 30/0631* (2013.01); *A23L 2/52* (2013.01); *A23L 5/00* (2016.08); *A23L 7/109* (2016.08);
(Continued)

(58) Field of Classification Search
CPC ........... G06Q 30/0631; G06Q 10/0631; G06Q 10/06315; G06Q 10/0635; G06Q 10/08;
(Continued)

(56) References Cited

U.S. PATENT DOCUMENTS 5,831,220 A * 11/1998 Ramsden ........... G01G 19/4144
177/1
6,857,073 B2  2/2005 French et al.
(Continued)

FOREIGN PATENT DOCUMENTS

| CN | 107609529 | 1/2018 |
| WO | 2017064202 A1 | 4/2017 |
| WO | 2017085314 A1 | 5/2017 |

OTHER PUBLICATIONS

International Search Report and Written Opinion issued in International Application No. PCT/US2018/044361 dated Oct. 10, 2018.
(Continued)

*Primary Examiner* — Techane Gergiso

(57) ABSTRACT

An autonomous robotic vehicle includes a conveyance system, a securable compartment configured to autonomously lock and unlock, a customer identification reader, at least one processor, and a memory storing instructions which, when executed by the at least one processor, causes the autonomous robotic vehicle to, autonomously: travel to a destination location of a customer; capture, by the customer identification reader at the destination location, a customer identification object; determine that the captured customer identification object matches an identity of the customer; unlock the securable compartment based on the determination; capture, by the product identification reader, a product identifier; and accept a product to be returned by locking the securable compartment. The securable compartment contains a product identification reader.

28 Claims, 12 Drawing Sheets

Related U.S. Application Data

(60) Provisional application No. 62/538,538, filed on Jul. 28, 2017.

(51) Int. Cl.

| | | |
|---|---|---|
| G06Q 10/08 | (2012.01) | |
| G06Q 50/28 | (2012.01) | |
| H04L 67/12 | (2022.01) | |
| G06Q 30/06 | (2012.01) | |
| G08G 1/04 | (2006.01) | |
| B60P 3/00 | (2006.01) | |
| B60R 21/34 | (2011.01) | |
| G01C 21/34 | (2006.01) | |
| G05D 1/00 | (2006.01) | |
| G05D 1/02 | (2020.01) | |
| G06K 7/10 | (2006.01) | |
| G06Q 10/06 | (2012.01) | |
| G06Q 50/12 | (2012.01) | |
| G08G 1/00 | (2006.01) | |
| G06N 20/00 | (2019.01) | |
| B60R 25/25 | (2013.01) | |
| A23L 5/00 | (2016.01) | |
| A23L 7/109 | (2016.01) | |
| G06F 16/955 | (2019.01) | |
| A23L 2/52 | (2006.01) | |
| A47J 37/06 | (2006.01) | |
| A47J 47/00 | (2006.01) | |
| B60H 1/00 | (2006.01) | |
| B60P 1/36 | (2006.01) | |
| B60P 3/025 | (2006.01) | |
| B60R 19/18 | (2006.01) | |
| G06K 7/14 | (2006.01) | |
| G06K 19/06 | (2006.01) | |
| G06Q 20/00 | (2012.01) | |
| G06Q 20/12 | (2012.01) | |
| G06Q 20/18 | (2012.01) | |
| G07F 17/00 | (2006.01) | |
| G07F 17/12 | (2006.01) | |
| G07C 5/02 | (2006.01) | |
| G07C 5/08 | (2006.01) | |
| G06V 20/56 | (2022.01) | |
| G06V 20/64 | (2022.01) | |
| G06Q 30/02 | (2023.01) | |
| G06Q 50/30 | (2012.01) | |
| G06K 19/07 | (2006.01) | |
| H04W 4/024 | (2018.01) | |
| H04W 4/40 | (2018.01) | |
| G01C 21/20 | (2006.01) | |
| B60R 19/48 | (2006.01) | |
| G06F 3/0484 | (2022.01) | |
| B60R 21/36 | (2011.01) | |
| H04N 5/76 | (2006.01) | |
| H05B 6/68 | (2006.01) | |

(52) U.S. Cl.
CPC ............ *A47J 37/0658* (2013.01); *A47J 47/00* (2013.01); *B60H 1/00364* (2013.01); *B60H 1/00735* (2013.01); *B60P 1/36* (2013.01); *B60P 3/007* (2013.01); *B60P 3/0257* (2013.01); *B60R 19/18* (2013.01); *B60R 19/483* (2013.01); *B60R 21/34* (2013.01); *B60R 25/25* (2013.01); *B60R 25/252* (2013.01); *B65G 67/24* (2013.01); *G01C 21/20* (2013.01); *G01C 21/343* (2013.01); *G01C 21/3438* (2013.01); *G01C 21/3453* (2013.01); *G05D 1/0027* (2013.01); *G05D 1/0033* (2013.01); *G05D 1/0038* (2013.01); *G05D 1/0061* (2013.01); *G05D 1/0088* (2013.01); *G05D 1/0094* (2013.01); *G05D 1/0212* (2013.01); *G05D 1/0214* (2013.01); *G05D 1/0223* (2013.01); *G05D 1/0231* (2013.01); *G05D 1/0276* (2013.01); *G05D 1/0291* (2013.01); *G05D 1/12* (2013.01); *G06F 16/955* (2019.01); *G06K 7/10297* (2013.01); *G06K 7/10722* (2013.01); *G06K 7/1413* (2013.01); *G06K 19/06028* (2013.01); *G06K 19/0723* (2013.01); *G06N 20/00* (2019.01); *G06Q 10/0631* (2013.01); *G06Q 10/0635* (2013.01); *G06Q 10/06315* (2013.01); *G06Q 10/08* (2013.01); *G06Q 10/083* (2013.01); *G06Q 10/0832* (2013.01); *G06Q 10/0833* (2013.01); *G06Q 10/0834* (2013.01); *G06Q 10/0835* (2013.01); *G06Q 10/0837* (2013.01); *G06Q 10/08355* (2013.01); *G06Q 20/00* (2013.01); *G06Q 20/127* (2013.01); *G06Q 20/18* (2013.01); *G06Q 30/0265* (2013.01); *G06Q 30/0266* (2013.01); *G06Q 30/0645* (2013.01); *G06Q 50/12* (2013.01); *G06Q 50/28* (2013.01); *G06Q 50/30* (2013.01); *G06V 20/56* (2022.01); *G06V 20/64* (2022.01); *G07C 5/02* (2013.01); *G07C 5/08* (2013.01); *G07F 17/0057* (2013.01); *G07F 17/12* (2013.01); *G08G 1/04* (2013.01); *G08G 1/202* (2013.01); *H04L 67/12* (2013.01); *H04W 4/024* (2018.02); *H04W 4/40* (2018.02); *A23V 2002/00* (2013.01); *B60R 21/36* (2013.01); *B60R 2021/346* (2013.01); *G05D 2201/0207* (2013.01); *G05D 2201/0213* (2013.01); *G06F 3/0484* (2013.01); *G08G 1/22* (2013.01); *H04N 5/76* (2013.01); *H05B 6/688* (2013.01)

(58) Field of Classification Search
CPC ............ G06Q 10/083; G06Q 10/0832; G06Q 10/0833; G06Q 10/0834; G06Q 10/0835; G06Q 10/08355; G06Q 10/0837; G06Q 20/00; G06Q 20/127; G06Q 20/18; G06Q 30/0265; G06Q 30/0266; G06Q 30/0645; G06Q 50/12; G06Q 50/28; G06Q 50/30; A23L 5/00; A23L 7/109; A23L 2/52; H04W 4/024; H04W 4/40; G06F 16/955; G06F 3/0484; G06N 20/00; G06V 20/64; G06V 20/56; A47J 37/0658; A47J 47/00; B60H 1/00364; B60H 1/00735; B60P 1/36; B60P 3/007; B60P 3/0257; B60R 19/18; B60R 19/483; B60R 21/34; B60R 25/25; B60R 25/252; B60R 21/36; B60R 2021/346; B65G 67/24; G01C 21/20; G01C 21/343; G01C 21/3438; G01C 21/3453; G05D 1/0027; G05D 1/0033; G05D 1/0038; G05D 1/0061; G05D 1/0088; G05D 1/0094; G05D 1/0212; G05D 1/0214; G05D 1/0223; G05D 1/0231; G05D 1/0276; G05D 1/0291; G05D 1/12; G05D 2201/0207; G05D 2201/0213; G06K 7/10297; G06K 7/10722; G06K 7/1413; G06K 19/06028; G06K 19/0723; G07C 5/02; G07C 5/08; G07F 17/0057; G07F 17/12; G08G 1/04; G08G 1/202; G08G 1/22; H04L 67/12; A23V 2002/00; H04N 5/76; H05B 6/688
See application file for complete search history.

(56) References Cited

U.S. PATENT DOCUMENTS

| | | | |
|---|---|---|---|
| 8,113,421 B2* | 2/2012 | Yepez | G07F 7/069 |
| | | | 235/375 |
| 8,744,642 B2 | 6/2014 | Nemat-Nasser et al. | |
| 8,989,053 B1* | 3/2015 | Skaaksrud | H04W 4/38 |
| | | | 370/255 |
| 9,043,012 B2 | 5/2015 | Davey et al. | |
| 9,256,852 B1 | 2/2016 | Myllymaki | |
| 9,381,890 B2 | 7/2016 | Lee et al. | |
| 9,552,564 B1* | 1/2017 | Martenis | G07C 9/00571 |
| 9,619,723 B1 | 4/2017 | Chow et al. | |
| 9,697,548 B1* | 7/2017 | Jaff | G06Q 30/0601 |
| 9,741,010 B1* | 8/2017 | Heinla | G06Q 10/083 |
| 9,792,576 B1* | 10/2017 | Jamjoom | B64C 39/024 |
| 10,248,120 B1 | 4/2019 | Siegel et al. | |
| 10,308,430 B1* | 6/2019 | Brady | G05D 1/0278 |
| 10,514,690 B1 | 12/2019 | Siegel et al. | |
| 2004/0172260 A1* | 9/2004 | Junger | G06Q 30/016 |
| | | | 705/21 |
| 2010/0084426 A1 | 4/2010 | Devers et al. | |
| 2010/0191978 A1* | 7/2010 | Pfau | G01G 11/046 |
| | | | 713/189 |
| 2011/0135189 A1 | 6/2011 | Lee | |
| 2013/0261792 A1* | 10/2013 | Gupta | G06Q 10/08 |
| | | | 700/232 |
| 2014/0081445 A1 | 3/2014 | Villamar | |
| 2014/0254896 A1* | 9/2014 | Zhou | G07F 17/12 |
| | | | 382/124 |
| 2014/0279668 A1* | 9/2014 | Lievens | G06Q 10/083 |
| | | | 705/340 |
| 2014/0330456 A1 | 11/2014 | Lopez Morales et al. | |
| 2015/0006005 A1 | 1/2015 | Yu et al. | |
| 2017/0046773 A1* | 2/2017 | Hendricks, II | G06Q 30/0635 |
| 2017/0091707 A1* | 3/2017 | Akselrod | G06Q 10/0836 |
| 2017/0091710 A1* | 3/2017 | Van Dyke | G08G 5/0043 |
| 2017/0091711 A1* | 3/2017 | Akselrod | G06Q 10/0836 |
| 2017/0154371 A1 | 6/2017 | Harvey | |
| 2017/0154483 A1 | 6/2017 | Cordiner et al. | |
| 2017/0174343 A1 | 6/2017 | Erickson et al. | |
| 2017/0286892 A1* | 10/2017 | Studnicka | B64C 39/024 |
| 2017/0313514 A1 | 11/2017 | Lert, Jr. et al. | |
| 2018/0096270 A1* | 4/2018 | High | G07C 9/38 |
| 2018/0137454 A1 | 5/2018 | Kulkarni et al. | |
| 2018/0144302 A1* | 5/2018 | Murray | G06K 9/00885 |
| 2018/0165638 A1 | 6/2018 | Wilkinson et al. | |
| 2018/0232839 A1 | 8/2018 | Heinla et al. | |
| 2018/0349834 A1 | 12/2018 | Heinla et al. | |
| 2018/0357693 A1* | 12/2018 | Balasubramanian | G05D 1/104 |
| 2019/0064847 A1 | 2/2019 | Ferguson et al. | |
| 2019/0270204 A1 | 9/2019 | Kawamura et al. | |
| 2019/0318306 A1 | 10/2019 | Mere | |
| 2019/0369641 A1 | 12/2019 | Gillett | |
| 2020/0174494 A1 | 6/2020 | Lessels | |

OTHER PUBLICATIONS

Google, "Autonomous Vehicle Deliveries, Biometric Authentication Receiver", Google Search, retrieved from Internet May 26, 2020, 2 pages.
International Search Report and Written Opinion in corresponding counterpart International Application CT/US2019/043893, dated Oct. 9, 2019, 19 pages.
International Search Report and Written Opinion in counterpart International Application No. PCT/US2019/043897, dated Oct. 31, 2019, 17 pages.
The Corrupt Senate, "[ANH] Droids for Sale (HD)", Dec. 31, 2016, https://www.youtube.com/watch?v=vxEOZOSnlgk, 1 page.
Google, "Smart Robot Delivery", Google Search, retrieved from Internet Jun. 7, 2020, 2 pages.

* cited by examiner

SYSTEMS AND METHODS FOR RETURN LOGISTICS FOR MERCHANDISE VIA AUTONOMOUS VEHICLE

CROSS-REFERENCE TO RELATED APPLICATIONS

The present application is a continuation-in-part of International Application No. PCT/US2018/044361, filed on Jul. 30, 2018, which claims the benefit of U.S. Provisional Application No. 62/538,538, filed on Jul. 28, 2017. The entire contents of each of the foregoing applications are hereby incorporated by reference.

FIELD OF THE TECHNOLOGY

The present application relates to autonomous vehicles, and in particular, to systems and methods for returning a merchandise to a vendor via an autonomous vehicle.

BACKGROUND

The field of fully-autonomous and/or semi-autonomous robots is a growing field of innovation. Robots are being used for many purposes including warehouse inventory operations, household vacuuming robots, hospital delivery robots, sanitation robots, and military or defense applications.

In the consumer space, handling and delivery of items by autonomous vehicles could improve society in many ways. For example, rather than spending time driving to a store, a person can instead engage in productive work while waiting for an autonomous vehicle to deliver the items. With fewer vehicles on the road, traffic conditions would also improve. For example, instead of several people driving to stores in several vehicles, a single autonomous vehicle could deliver items to those people and return items to the stores, and thereby reduce the number of vehicles on the road. Accordingly, there is interest in developing technologies for delivery and return of items and services via an autonomous vehicle.

SUMMARY

This disclosure relates to a fully-autonomous and/or semi-autonomous robot fleet and, in particular, to systems and methods for returning a merchandise to a vendor via an autonomous vehicle.

In accordance with an embodiment of the present disclosure, an autonomous robotic vehicle includes a conveyance system, a securable compartment configured to autonomously lock and unlock, a customer identification reader, at least one processor, and a memory storing instructions which, when executed by the at least one processor, causes the autonomous robotic vehicle to, autonomously: travel to a destination location of a customer; capture, by the customer identification reader at the destination location, a customer identification object; determine that the captured customer identification object matches an identity of the customer; unlock the securable compartment based on the determination; capture, by the product identification reader, a product identifier; and accept a product to be returned by locking the securable compartment. The securable compartment contains a product identification reader.

In an embodiment, the customer identification reader may include a camera, a scanner, or a keypad.

In another embodiment, the memory storing instructions which, when executed by the at least one processor, may cause the autonomous robotic vehicle to determine if the product identifier matches a product in a vendor's database.

In yet another embodiment, the memory storing instructions which, when executed by the at least one processor, may cause the autonomous robotic vehicle to determine that the product identifier matches a product previously ordered by the customer.

In still yet another embodiment, the memory storing instructions which, when executed by the at least one processor, may cause the autonomous robotic vehicle to determine whether the product identifier meets a return criteria of a vendor.

In still yet another embodiment, the memory storing instructions which, when executed by the at least one processor, may cause the autonomous robotic vehicle to travel to a location of a vendor to return the product.

In an embodiment, the memory storing instructions which, when executed by the at least one processor, may cause the autonomous robotic vehicle to determine a distance between a location of the autonomous robotic vehicle and the destination location of the customer.

In another embodiment, the memory storing instructions which, when executed by the at least one processor, may cause the autonomous robotic vehicle to send a notification to the customer if the distance is less than a pre-set distance.

In still yet another embodiment, the memory storing instructions which, when executed by the at least one processor, may cause the autonomous robotic vehicle to estimate a time of arrival at the destination location of the customer.

In another embodiment, the memory storing instructions which, when executed by the at least one processor, may cause the autonomous robotic vehicle to send a notification to the customer if the estimated time of arrival is later than a schedule arrival time.

In an embodiment, the product identification reader may include a camera, a barcode reader or a scale.

In accordance with another aspect of the present disclosure, an autonomous delivery management system includes at least one processor and a memory storing instructions which, when executed by the at least one processor, causes the autonomous delivery management system to: access customer information including order history of an item to be returned; access product information of the item to be returned; determine a handling itinerary for a return of the item; and communicating instructions to an autonomous vehicle based on the handling itinerary.

In an embodiment, the memory storing instructions which, when executed by the at least one processor, may cause the autonomous delivery management system to communicate instructions to the autonomous vehicle to unlock the securable compartment based on the handling itinerary.

In another embodiment, the memory storing instructions which, when executed by the at least one processor, may cause the autonomous delivery management system to receive, from a device of a customer, an identification object captured by the device, and a location of the device.

In yet another embodiment, the memory storing instructions which, when executed by the at least one processor, may cause the autonomous delivery management system to determine that the identification object captured by the device matches an identity of the customer.

In an embodiment, the memory storing instructions which, when executed by the at least one processor, may cause the autonomous delivery management system to receive, from a device of a customer, a pickup time and location of the item to be returned.

In another embodiment, the memory storing instructions which, when executed by the at least one processor, may cause the autonomous delivery management system to receive an indication, from the autonomous robotic vehicle, of a location of the autonomous vehicle.

In an embodiment, the memory storing instructions which, when executed by the at least one processor, may cause the autonomous delivery management system to receive an indication, from the autonomous robotic vehicle, of receipt of the item to be returned.

In another embodiment, the handling itinerary may include a route to be taken by the autonomous robotic vehicle.

BRIEF DESCRIPTION OF THE DRAWINGS

A better understanding of the features and advantages of the disclosed technology will be obtained by reference to the following detailed description that sets forth illustrative embodiments, in which the principles of the technology are utilized, and the accompanying drawings of which.

DETAILED DESCRIPTION

Figure 1:
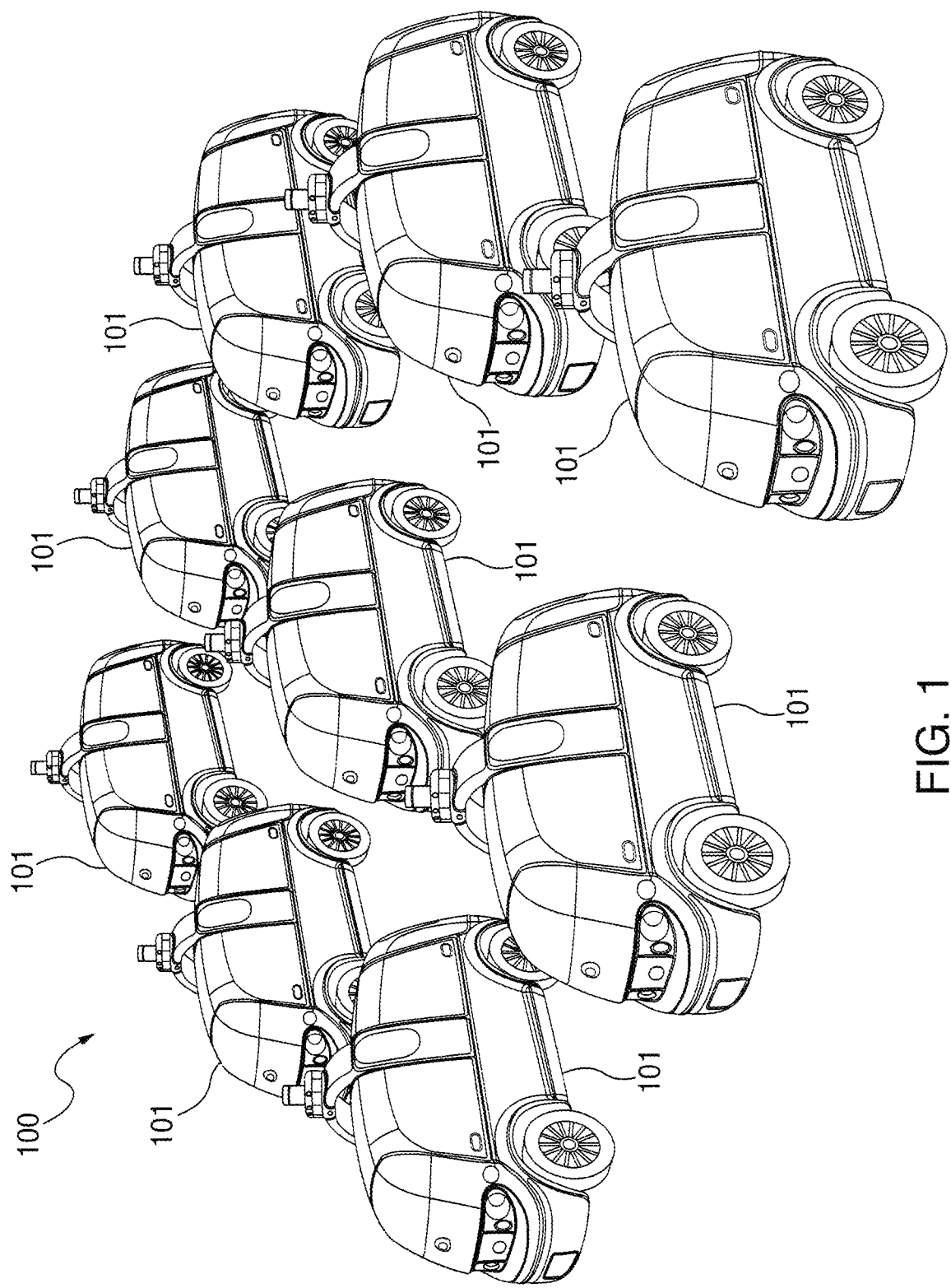
FIG. 1 is an exemplary view an autonomous robot fleet, wherein each vehicle within a fleet or sub-fleet can be branded for an entity.
Figure 2:
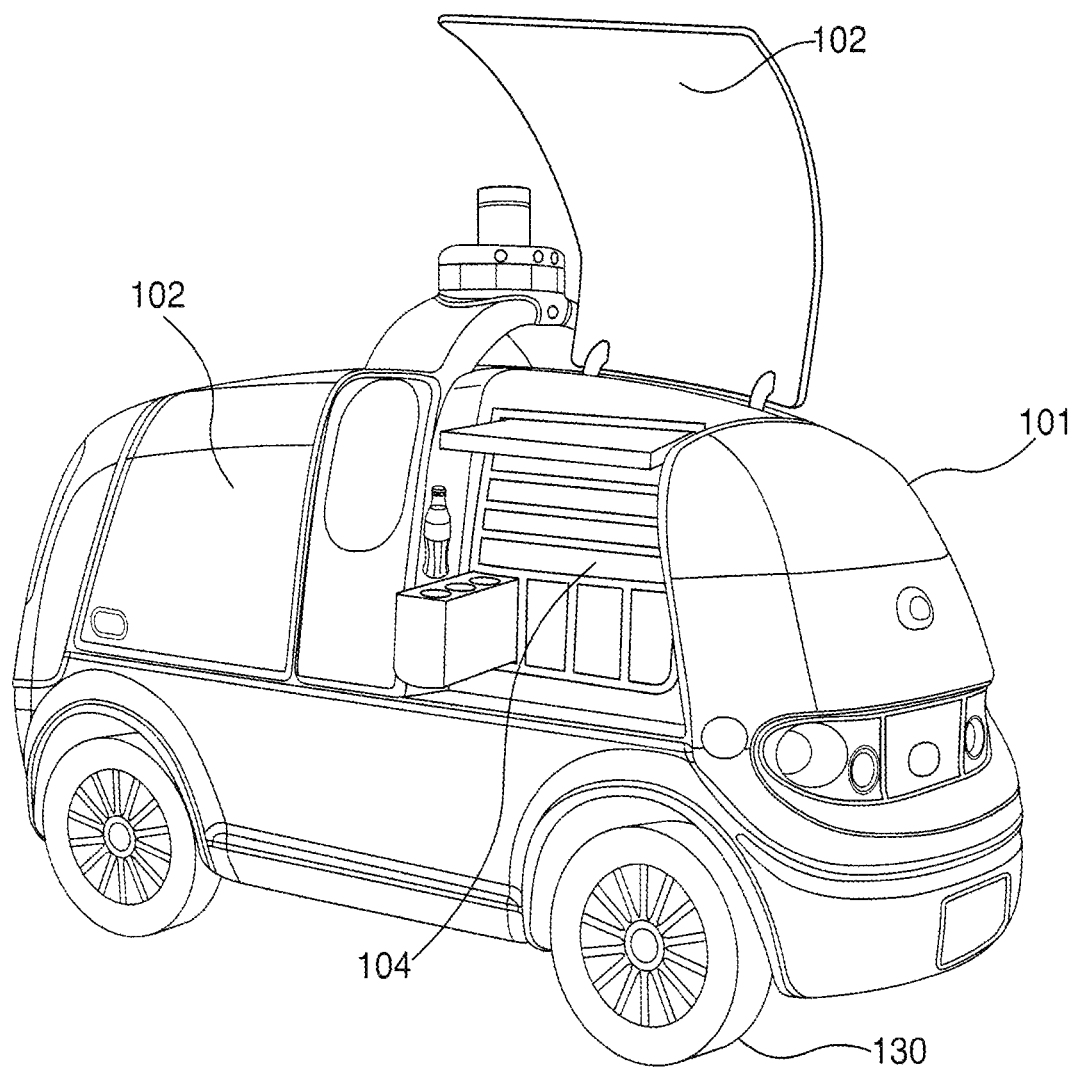
FIG. 2 is an exemplary ISO view of a robot vehicle, part of an autonomous robot fleet, illustrating securable compartments within the vehicle.
Figure 3:
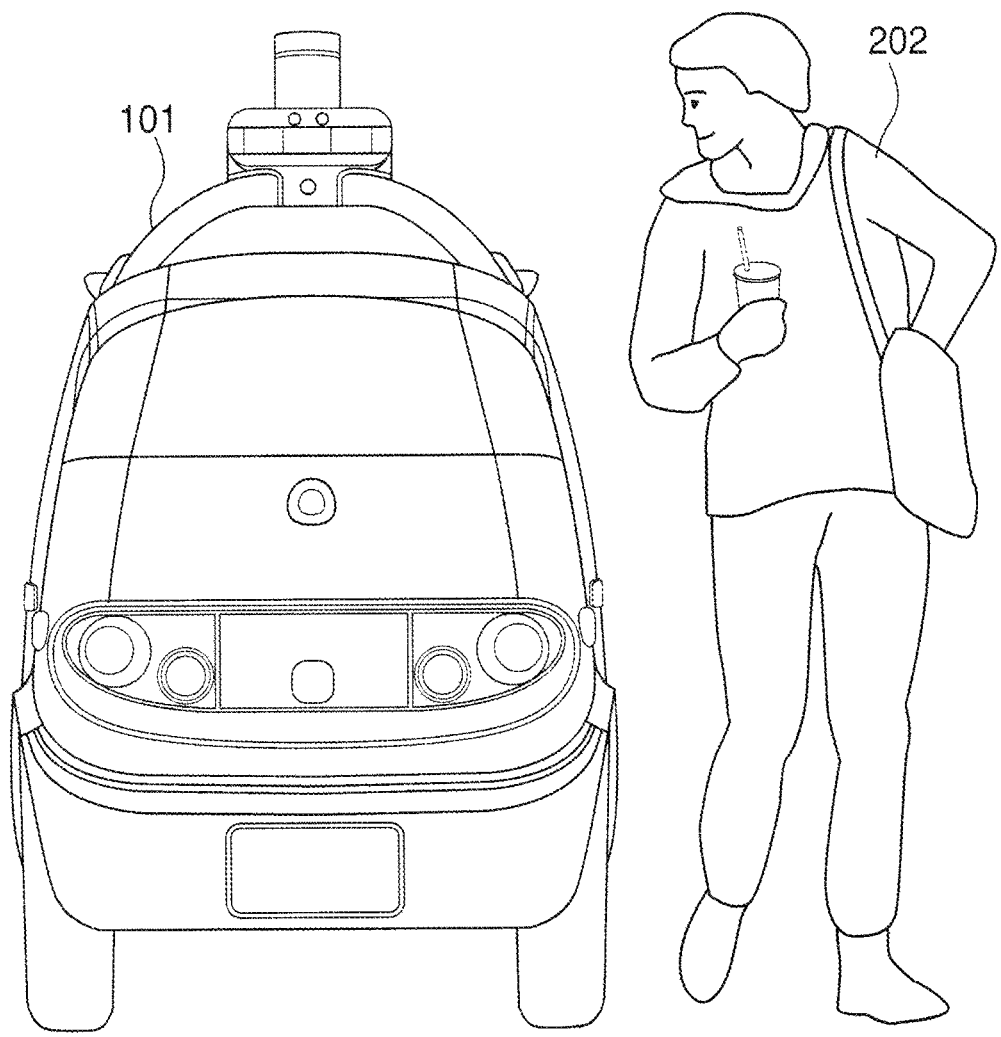
FIG. 3 is an exemplary front view of a robot vehicle, part of an autonomous robot fleet, shown in comparison to the height of an average person.
Figure 4:
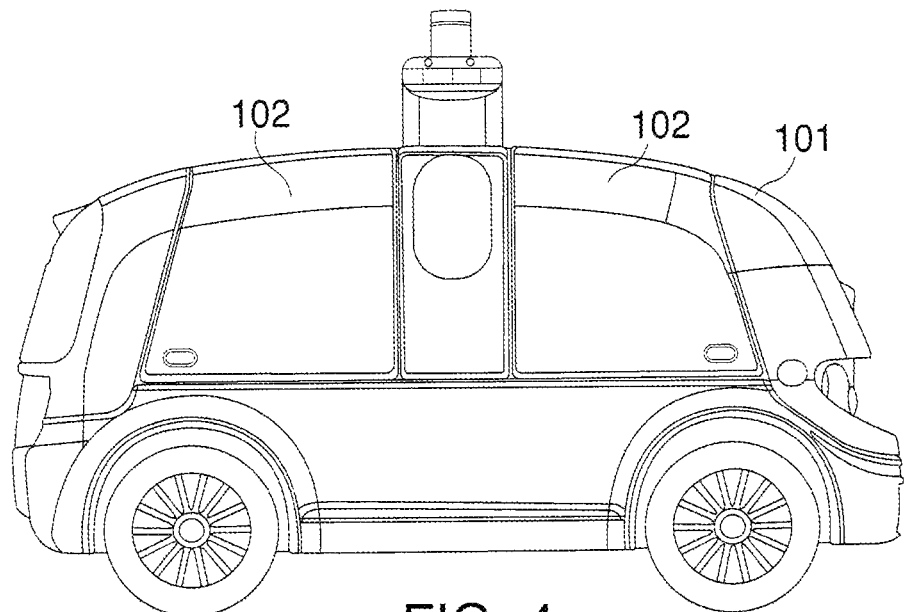
FIG. 4 is an exemplary right side view of a robot vehicle, part of an autonomous robot fleet, illustrating a configuration with two large side doors, each enclosing securable compartments.
Figure 5:
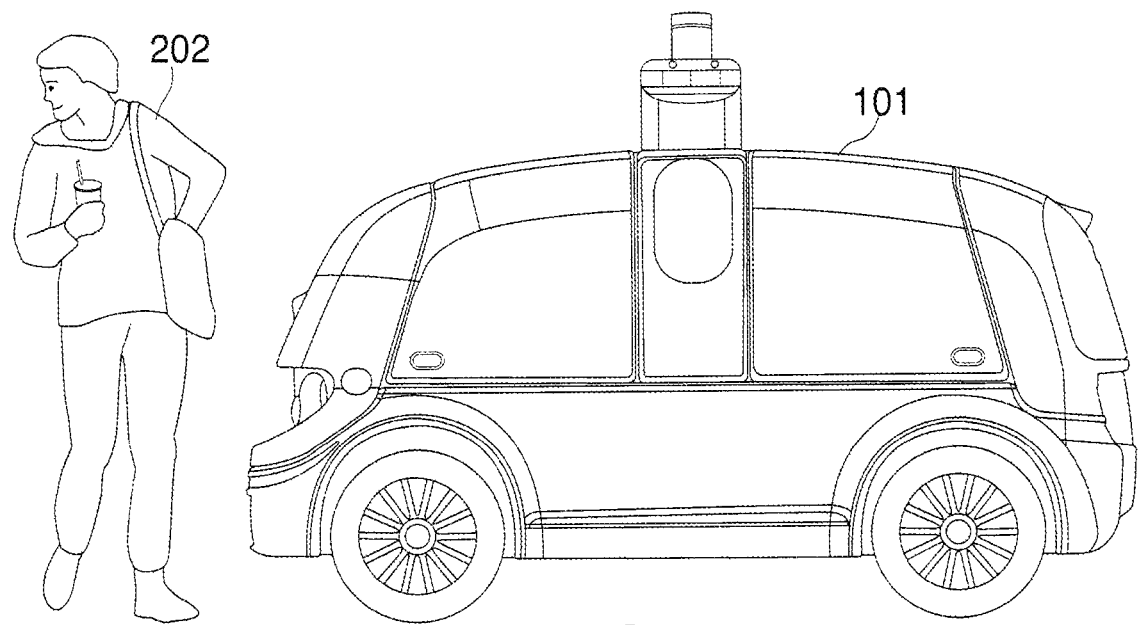
FIG. 5 is an exemplary left side view of a robot vehicle, part of an autonomous robot fleet, shown in comparison to the height of an average person.
Figure 6:
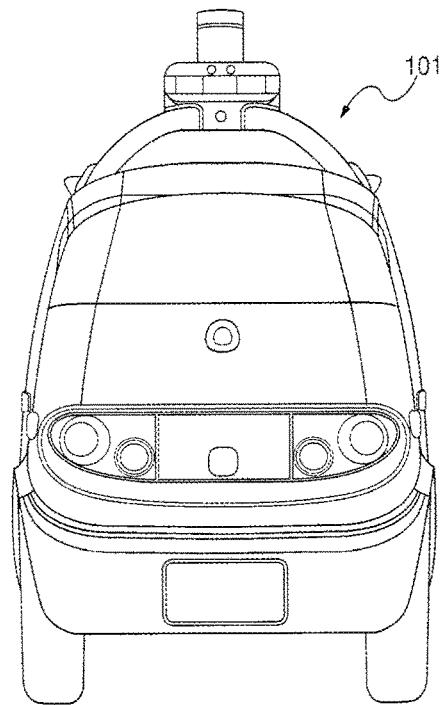
FIG. 6 is an exemplary rear view of a robot vehicle, part of an autonomous robot fleet.
Figure 7:
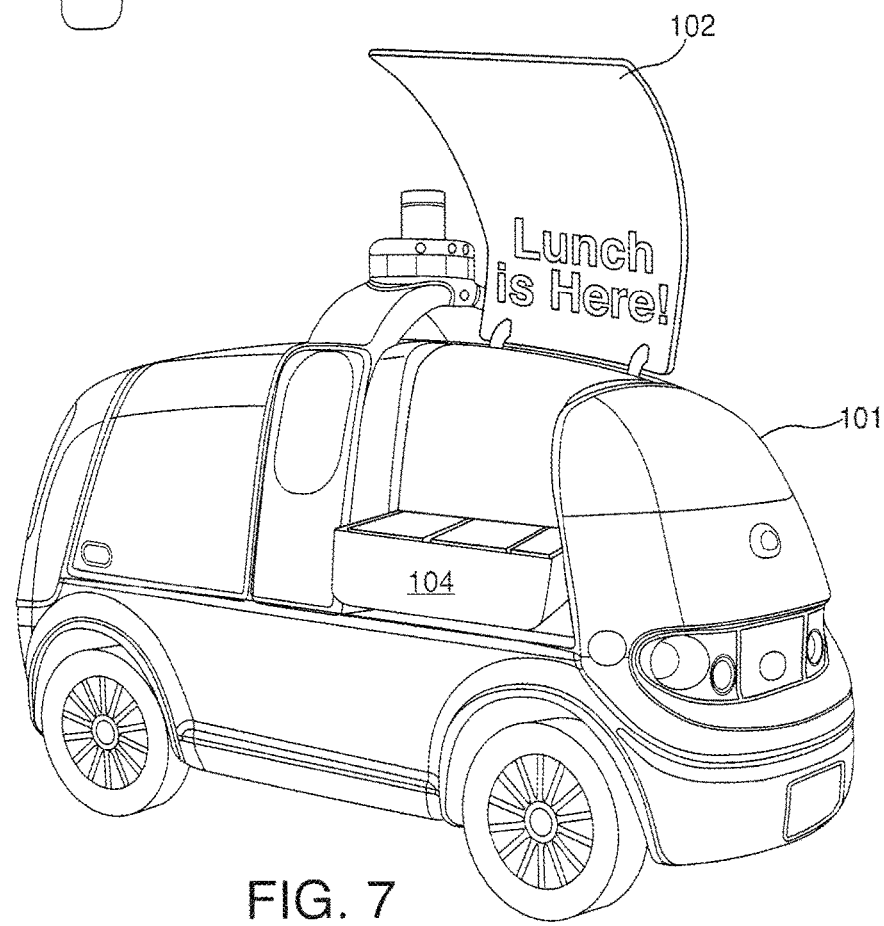
FIG. 7 is an exemplary ISO view of a robot vehicle, part of an autonomous robot fleet, illustrating an autonomous lunch delivery vehicle for any branded company.
Figure 8:
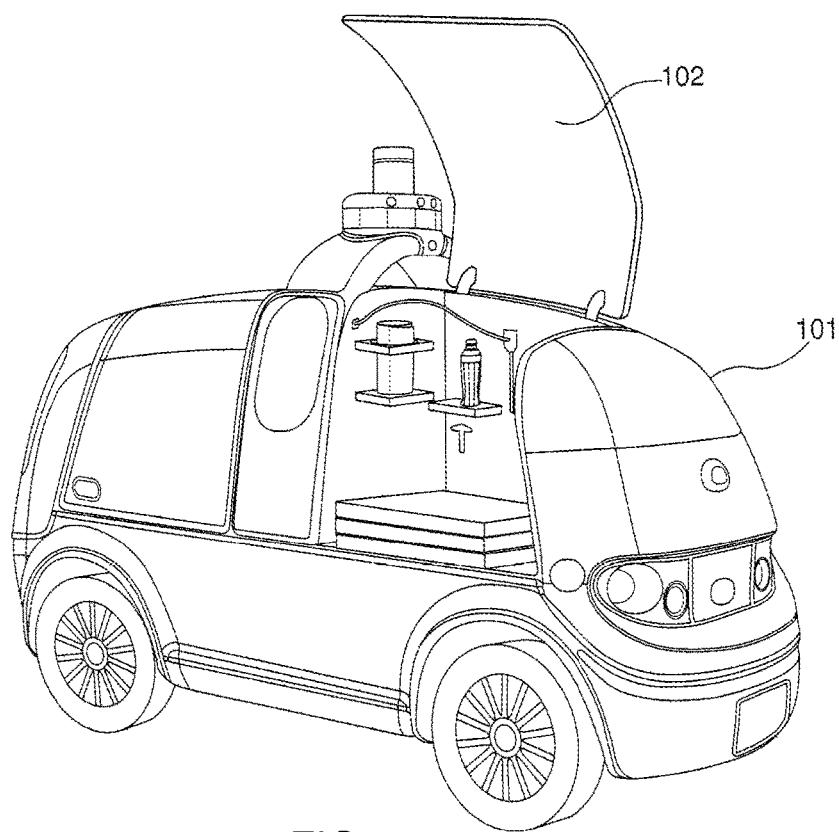
FIG. 8 is an exemplary ISO view of a robot vehicle, part of an autonomous robot fleet, illustrating an autonomous pizza delivery vehicle for any branded company.
Figure 9:
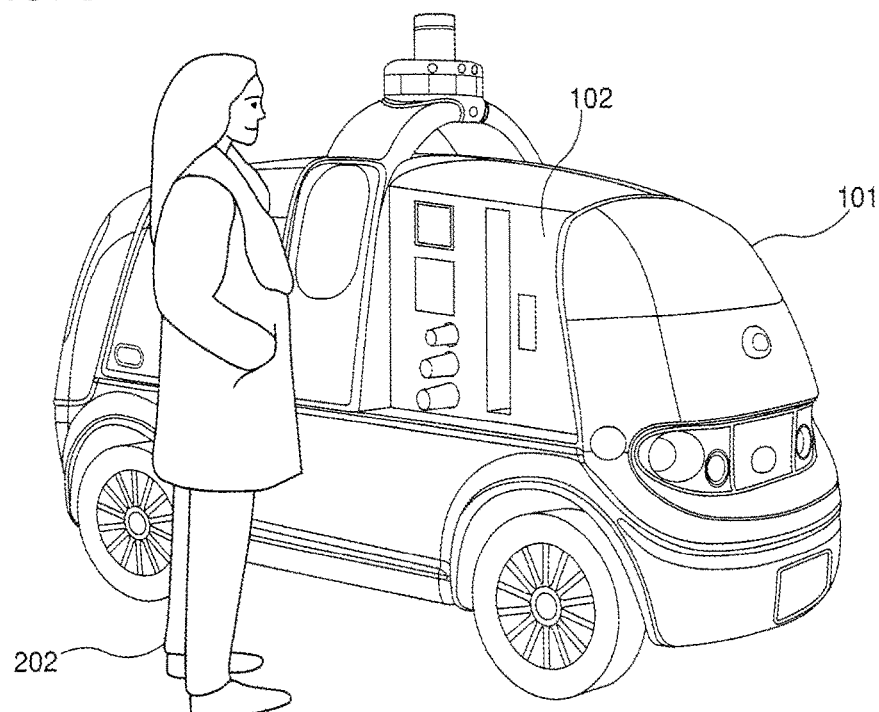
FIG. 9 is an exemplary ISO view of a robot vehicle, part of an autonomous robot fleet, illustrating an autonomous coffee delivery vehicle for any branded company.
Figure 10:
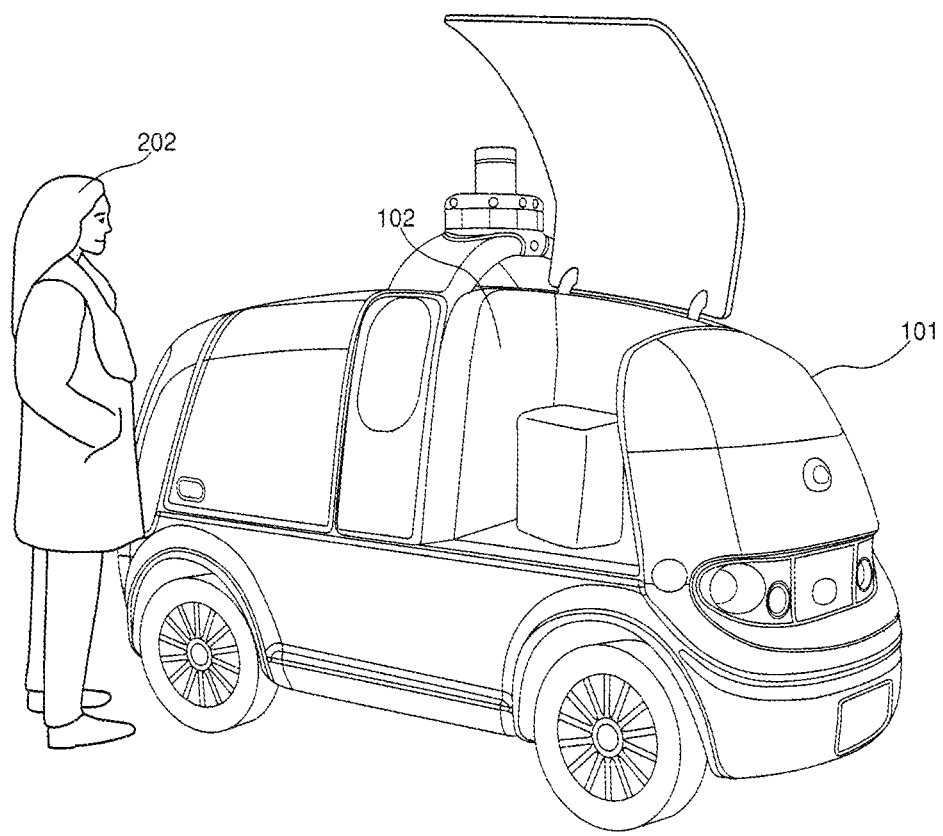
FIG. 10 is an exemplary ISO view of a robot vehicle, part of an autonomous robot fleet, illustrating an autonomous evening/nighttime delivery vehicle for any branded company, comprising a lighted interior.

This disclosure relates to a fully-autonomous and/or semi-autonomous robot fleet and, in particular, to robot vehicles for transporting goods in either open unstructured outdoor environments or closed environments.

Provided herein is a robot fleet having robot vehicles operating fully-autonomously or semi-autonomously and a fleet management module for coordination of the robot fleet, where each robot within the fleet is configured for transporting, delivering or returning goods or services and is capable of operating in an unstructured open or closed environment. Each robot can include a power system, a conveyance system, a navigation module, at least one securable compartment or multiple securable compartments to hold goods, a controller configurable to associate each of the securable compartments to an assignable customer, a customer group within a marketplace, or provider and provide entry when authorized, a communication module and a processor configured to manage the conveyance system, the navigation module, the sensor system, the communication module and the controller.

As used herein, the term "autonomous" includes fully-autonomous, semi-autonomous, and any configuration in which a vehicle can travel in a controlled manner for a period of time without human intervention.

As used herein, the term "fleet," "sub-fleet," and like terms are used to indicate a number of land vehicles, watercraft or aircraft operating together or under the same ownership. In some embodiments the fleet or sub-fleet is engaged in the same activity. In some embodiments, the fleet or sub-fleet are engaged in similar activities. In some embodiments, the fleet or sub-fleet are engaged in different activities.

As used herein, the term "robot," "robot vehicle," "robot fleet," "vehicle," "all-terrain vehicle," and like terms are used to indicate a mobile machine that transports cargo, items, and/or goods. Typical vehicles include cars, wagons, vans, unmanned motor vehicles (e.g., tricycles, trucks, trailers, buses, etc.), unmanned railed vehicles (e.g., trains, trams, etc.), unmanned watercraft (e.g., ships, boats, ferries, landing craft, barges, rafts, etc.), aerial drones, unmanned hovercraft (air, land and water types), unmanned aircraft, and even including unmanned spacecraft.

As used herein, the term "compartment" is used to indicate an internal bay of a robot vehicle that has a dedicated door at the exterior of the vehicle for accessing the bay, and also indicates an insert secured within the bay. The term "sub-compartment" is generally used to indicate a subdivision or portion of a compartment. When used in the context of a compartment or sub-compartment, the term "module" may be used to indicate one or more compartments or sub-compartments.

As used herein, the term "user," "operator," "fleet operator," and like terms are used to indicate the entity that owns or is responsible for managing and operating the robot fleet.

As used herein, the term "customer" and like terms are used to indicate the entity that requests the services provided the robot fleet.

As used herein, the term "provider," "business," "vendor," "third party vendor," and like terms are used to indicate an entity that works in concert with the fleet owner or operator to utilize the services of the robot fleet to deliver the provider's product from and or return the provider's product to the provider's place of business or staging location.

As used herein, the term "server," "computer server," "central server," "main server," and like terms are used to indicate a computer or device on a network that manages the fleet resources, namely the robot vehicles.

As used herein, the term "controller" and like terms are used to indicate a device that controls the transfer of data from a computer to a peripheral device and vice versa. For example, disk drives, display screens, keyboards, and printers all require controllers. In personal computers, the controllers are often single chips. As used herein the controller is commonly used for managing access to components of the robot such as the securable compartments.

As used herein a "mesh network" is a network topology in which each node relays data for the network. All mesh nodes cooperate in the distribution of data in the network. It can be applied to both wired and wireless networks. Wireless mesh networks can be considered a type of "Wireless ad hoc" network. Thus, wireless mesh networks are closely related to Mobile ad hoc networks (MANETs). Although MANETs are not restricted to a specific mesh network topology, Wireless ad hoc networks or MANETs can take any form of network topology. Mesh networks can relay messages using either a flooding technique or a routing technique. With routing, the message is propagated along a path by hopping from node to node until it reaches its destination. To ensure that all its paths are available, the network must allow for continuous connections and must reconfigure itself around broken paths, using self-healing algorithms such as Shortest Path Bridging. Self-healing allows a routing-based network to operate when a node breaks down or when a connection becomes unreliable. As a result, the network is typically quite reliable, as there is often more than one path between a source and a destination in the network. This concept can also apply to wired networks and to software interaction. A mesh network whose nodes are all connected to each other is a fully connected network.

As used herein, the term "module" and like terms are used to indicate a self-contained hardware component of the central server, which in turn includes software modules. In software, a module is a part of a program. Programs are composed of one or more independently developed modules that are not combined until the program is linked. A single module can contain one or several routines, or sections of programs that perform a particular task. As used herein the fleet management module includes software modules for managing various aspects and functions of the robot fleet.

As used herein, the term "processor," "digital processing device" and like terms are used to indicate a microprocessor or central processing unit (CPU). The CPU is the electronic circuitry within a computer that carries out the instructions of a computer program by performing the basic arithmetic, logical, control and input/output (I/O) operations specified by the instructions.

In accordance with the description herein, suitable digital processing devices include, by way of non-limiting examples, server computers, desktop computers, laptop computers, notebook computers, sub-notebook computers, netbook computers, netpad computers, set-top computers, handheld computers, Internet appliances, mobile smartphones, tablet computers, personal digital assistants, video game consoles, and vehicles. Those of skill in the art will recognize that many smartphones are suitable for use in the system described herein. Suitable tablet computers include those with booklet, slate, and convertible configurations, known to those of skill in the art.

In some embodiments, the digital processing device includes an operating system configured to perform executable instructions. The operating system is, for example, software, including programs and data, which manages the device's hardware and provides services for execution of applications. Those of skill in the art will recognize that suitable server operating systems include, by way of non-limiting examples, FreeBSD, OpenBSD, NetBSD®, Linux, Apple® Mac OS X Server®, Oracle® Solaris®, Windows Server®, and Novell® NetWare®. Those of skill in the art will recognize that suitable personal computer operating systems include, by way of non-limiting examples, Microsoft® Windows®, Apple® Mac OS X®, UNIX®, and UNIX like operating systems such as GNU/Linux®. In some embodiments, the operating system is provided by cloud computing. Those of skill in the art will also recognize that suitable mobile smart phone operating systems include, by way of non-limiting examples, Nokia® Symbian® OS, Apple® iOS®, Research In Motion® BlackBerry OS®, Google® Android®, Microsoft® Windows Phone® OS, Microsoft® Windows Mobile® OS, Linux®, and Palm® WebOS®.

In some embodiments, the device includes a storage and/or memory device. The storage and/or memory device is one or more physical apparatus used to store data or programs on a temporary or permanent basis. In some embodiments, the device is volatile memory and requires power to maintain stored information. In some embodiments, the device is non-volatile memory and retains stored information when the digital processing device is not powered. In some embodiments, the non-volatile memory includes flash memory. In some embodiments, the non-volatile memory includes dynamic random-access memory (DRAM). In some embodiments, the non-volatile memory includes ferroelectric random access memory (FRAM). In some embodiments, the nonvolatile memory includes phase-change random access memory (PRAM). In some embodiments, the device is a storage device including, by way of non-limiting examples, CD-ROMs, DVDs, flash memory devices, magnetic disk drives, magnetic tapes drives, optical disk drives, and cloud computing based storage. In some embodiments, the storage and/or memory device is a combination of devices such as those disclosed herein.

In some embodiments, the digital processing device includes a display to send visual information to a user. In some embodiments, the display is a cathode ray tube (CRT). In some embodiments, the display is a liquid crystal display (LCD). In some embodiments, the display is a thin film transistor liquid crystal display (TFT-LCD). In some embodiments, the display is an organic light emitting diode (OLED) display. In various some embodiments, on OLED display is a passive-matrix OLED (PMOLED) or active-matrix OLED (AMOLED) display. In some embodiments, the display is a plasma display. In some embodiments, the display is a video projector. In some embodiments, the display is interactive (e.g., having a touch screen or a sensor such as a camera, a 3D sensor, a LiDAR, a radar, etc.) that can detect user interactions/gestures/responses and the like. In still some embodiments, the display is a combination of devices such as those disclosed herein.

The Fleet of Robot Vehicles

Provided herein is a robot fleet 100, as illustrated in FIG. 1, having robots 101, with each one operating fully-autonomously or semi-autonomously.

As illustrated in FIGS. 3-6, one exemplary configuration of a robot 101 is a vehicle configured for land travel, such as a small fully-autonomous (or semi-autonomous) automobile. The exemplary fully-autonomous (or semi-autonomous) automobile is narrow (i.e., 2-5 feet wide), low mass and low center of gravity for stability, having multiple secure compartments assignable to one or more customers, retailers and/or vendors, and designed for moderate working speed ranges (i.e., 1.0-45.0 mph) to accommodate inner-city and residential driving speeds. Additionally, in some embodiments, the land vehicle robot units in the fleet are configured with a maximum speed range from 1.0 mph to about 90.0 mph for high speed, intrastate or interstate driving. Each robot in the fleet is equipped with onboard sensors 170 (e.g., cameras (running at a high frame rate, akin to video), LiDAR, radar, ultrasonic sensors, microphones, etc.) and internal computer processing to constantly determine where it can safely navigate, what other objects are around each robot and what it may do. In in some embodiments, the robot fleet is fully-autonomous.

In in some embodiments, the robot fleet is semi-autonomous. In some embodiments, it may be necessary to have human interaction between the robot 101, the fleet operator 200, the provider 204 and/or the customer 202 to address previously unforeseen issues (e.g., a malfunction with the navigation module; provider inventory issues; unanticipated traffic or road conditions; or direct customer interaction after the robot arrives at the customer location).

In in some embodiments, the robot fleet 100 is controlled directly by the user 200. In some embodiments, it may be necessary to have direct human interaction between the robot 101 and/or the fleet operator 200 to address maintenance issues such as mechanical failure, electrical failure or a traffic accident.

In some embodiments, the robot fleet is configured for land travel. In some embodiments, each robot land vehicle in the fleet is configured with a working speed range from 13.0 mph to 45.0 mph. In some embodiments, the land vehicle robot units in the fleet are configured with a maximum speed range from 13.0 mph to about 90.0 mph.

In some embodiments, the robot fleet is configured for water travel as a watercraft and is configured with a working speed range from 1.0 mph to 45.0 mph.

In some embodiments, the robot fleet is configured for hover travel as an over-land or over water hovercraft and is configured with a working speed range from 1.0 mph to 60.0 mph.

In some embodiments, the robot fleet is configured for air travel as an aerial drone or aerial hovercraft and is configured with a working speed range from 1.0 mph to 80.0 mph.

In some embodiments of the robot fleet, the autonomous robots within the fleet are operated on behalf of third party vendor/service provider.

For example, a fleet management service is established to provide a roving delivery service for a third party beverage/food provider (e.g., a coffee service/experience for a third party vendor (i.e., Starbucks)). It is conceived that the fleet management service would provide a sub-fleet of "white label" vehicles carrying the logo and products of that third party beverage/food provider to operate either fully-autonomously or semi-autonomously to provide this service.

In some embodiments of the robot fleet, the autonomous robots within the fleet are further configured to be part of a sub-fleet of autonomous robots, and each sub-fleet is configured to operate independently or in tandem with multiple sub-fleets having two or more sub-fleets (100-a, 100-b).

For example, a package delivery service is configured to offer multiple levels of service such as "immediate dedicated rush service," "guaranteed morning/afternoon delivery service," or "general delivery service." A service provider could then have a dedicated sub-fleet of delivery vehicles for each type of service within their overall fleet of vehicles. In yet another example, a third party has priority over a certain number of vehicles in the fleet. In so doing, they can guarantee a certain level of responsiveness. When they aren't using the vehicles, the vehicles are used for general services within the fleet (e.g., other third parties).

In some embodiments, the robot fleet is controlled directly by the user.

In some embodiments, there will likely be times when a vehicle breaks down, has an internal system or module failure or is in need of maintenance. For example, in the event that the navigation module should fail, each robot within the fleet is configurable to allow for direct control of the robot's processor to override the conveyance and sensor systems (i.e., cameras, etc.) by a fleet operator to allow for the safe return of the vehicle to a base station for repair.

The Operating Environments

In some embodiments, the unstructured open environment is a non-confined geographic region accessible by navigable pathways, including, for example, public roads, private roads, bike paths, open fields, open public lands, open private lands, pedestrian walkways, lakes, rivers or streams.

In some embodiments, the closed environment is a confined, enclosed or semi-enclosed structure accessible by navigable pathways, including, for example, open areas or rooms within commercial architecture, with or without structures or obstacles therein, airspace within open areas or rooms within commercial architecture, with or without structures or obstacles therein, public or dedicated aisles, hallways, tunnels, ramps, elevators, conveyors, or pedestrian walkways.

In some embodiments, the unstructured open environment is a non-confined airspace or even near-space environment which includes all main layers of the Earth's atmosphere including the troposphere, the stratosphere, the mesosphere, the thermosphere and the exosphere.

The Fleet Management Module

In some embodiments of the robot fleet 100, the fleet includes a fleet management module 120 (associated with a central server) for coordination of the robot fleet 100 and assignment of tasks for each robot 101 in the fleet. The fleet management module coordinates the activity and positioning of each robot in the fleet. In addition to communicating with the robot fleet, fleet owner/operator and/or user, the fleet management module also communicates with providers/vendors/businesses and customers to optimize behavior of the entire system.

The fleet management module works in coordination with a central server 110, typically located in a central operating facility owned or managed by the fleet owner 200.

Figure 11:
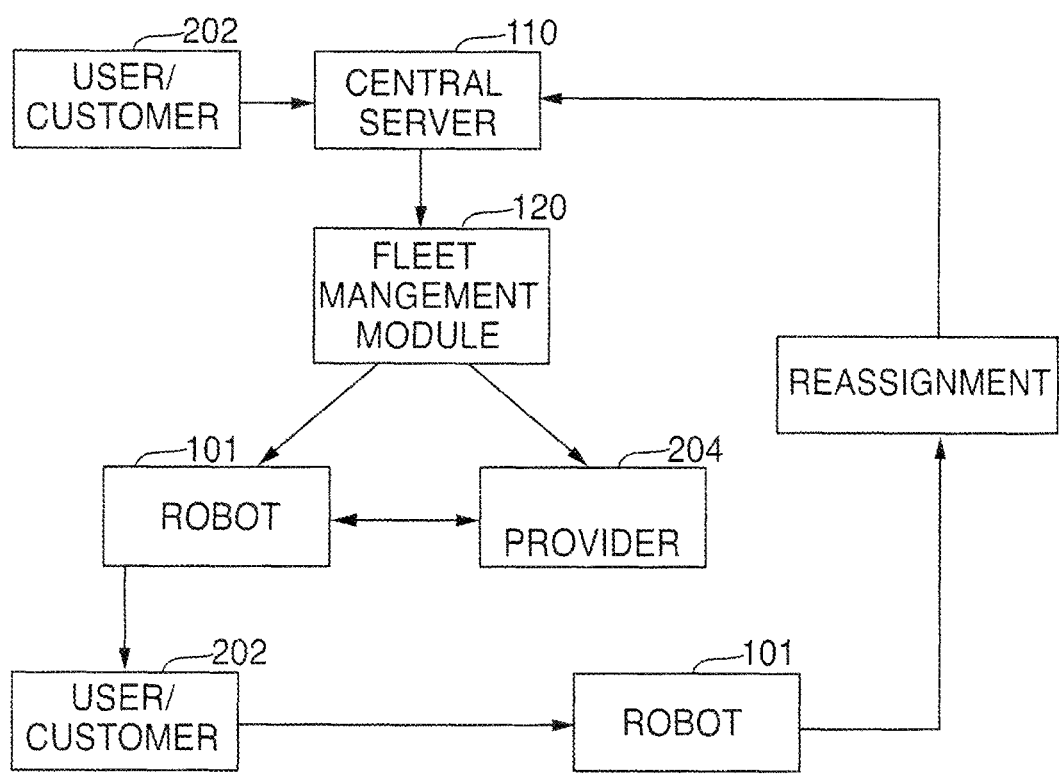
FIG. 11 is an exemplary flowchart representation of the logic for a fleet management control module associated with a central server for the robot fleet.

As illustrated in FIG. 11, in one embodiment, a request for a merchandise return is sent to a central server 110 (typically located at the fleet owner's or fleet manager's location), which then communicates with the fleet management module 120. The fleet management module 120 then relays the request to the appropriate provider 204 of the merchandise (e.g., vendor or retailer) and an appropriate robot or robots 101 in the fleet. The best suited robot(s) in the fleet within the geographic region and typically closest to the provider 204, is then assigned the task. The robot then travels to the customer 202 and the customer 202 interacts with the robot 101 to return a merchandise. An interaction may include requesting the robot 101 to open its compartment 102, 104 through the customer's app or through a user interface on the robot 101 (using, e.g., RFID reader and customer phone, a touchpad, a keypad, voice commands, vision-based recognition of the person, etc.). Upon completion of the delivery of the returned merchandise, the robot 101 reports completion of the assignment and reports back to the fleet management module for re-assignment.

Figure 12:
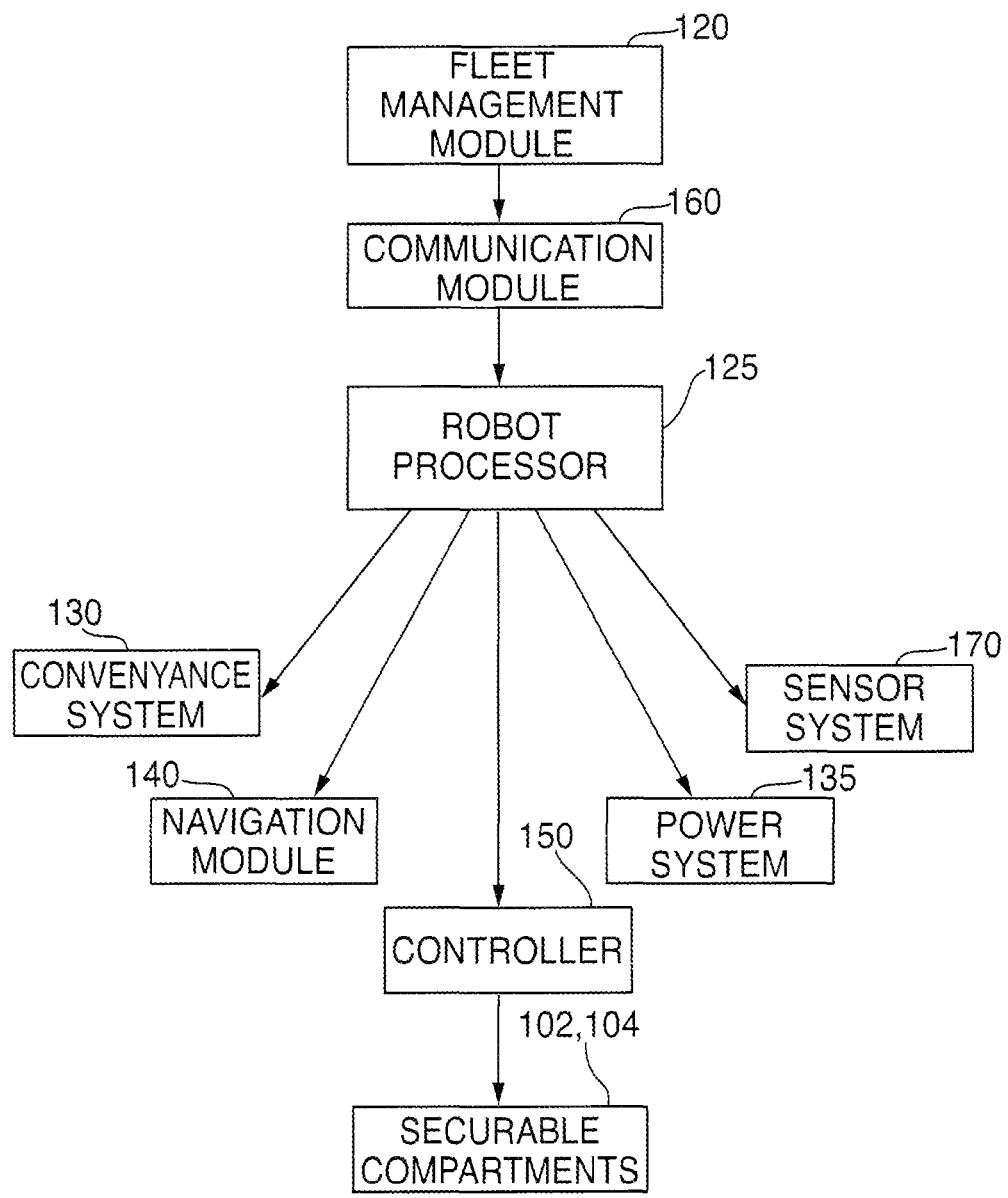
FIG. 12 is an exemplary flowchart representation of the logic flow from the Fleet Management Control Module through the robot processor to the various systems and modules of the robot.

As further illustrated in FIG. 12, and previously noted, in some embodiments, the fleet management module 120 handles coordination of the robot fleet 100 and assignment of tasks for each robot 101 in the fleet. The fleet management module 120 coordinates the activity and positioning of each robot 101 in the fleet. The fleet management module 120 also communicates with the provider (vendors/businesses) 204 and customers 202 to optimize behavior of entire system. It does this by utilizing the robot's processor 125 to process the various inputs and outputs from each of the robot's systems and modules, including: the conveyance system 130, the power system 135, the navigation module 140, the sensor system 170, the communication module 160, and the controller 150, to effectively manage and coordinate the various functions of each robot 101 in the fleet.

When the robot 101 is requested for a pickup of an item (return merchandise), the fleet management module 120 assigns the robot 101 to arrive at a given location, assigns a securable compartment for receipt of the item, confirms receipt from the first party to the fleet management module, then proceed to the second location where an informed receiving party would recover the item from the robot 101 using an appropriate PIN or other recognition code to gain access to the secure compartment, as will be discussed in detail below. The robot would then reports completion of the assignment and report back to the fleet management module for re-assignment.

Conveyance Systems

Each robot vehicle 101 in the fleet includes a conveyance system 130 (e.g., a drive system with a propulsion engine, wheels, treads, wings, rotors, blowers, rockets, propellers, brakes, etc.).

As noted previously, the robot fleet is configurable for land, water or air. Typical vehicles include cars, wagons, vans, unmanned motor vehicles (e.g., tricycles, trucks, trailers, buses, etc.), unmanned railed vehicles (e.g., trains, trams, etc.), unmanned watercraft (e.g., ships, boats, ferries, landing craft, barges, rafts, etc.), aerial drones, unmanned hovercraft (air, land, and water types), unmanned aircraft, and unmanned spacecraft.

In one exemplary embodiment, a robot land vehicle 101 is configured with a traditional 4-wheeled automotive configuration comprising conventional steering and braking systems. The drive train is configurable for standard 2-wheel drive or 4-wheel all-terrain traction drive. The propulsion system (engine) is configurable as a gas engine, a turbine engine, an electric motor and/or a hybrid gas/electric engine. Alternatively, the robot could be configured with an auxiliary solar power system 135 to provide back-up emergency power or power for minor low-power sub-systems.

Alternative configurations of components to a total drive system with a propulsion engine could include wheels, treads, wings, rotors, blowers, rockets, propellers, brakes, etc.

In some embodiments, the robot fleet is configured for water travel as a watercraft with a propulsion system (engine) that is configurable as a gas engine, a turbine engine, an electric motor and/or a hybrid gas/electric engine and is further configured with a propeller.

In some embodiments, the robot fleet is configured for hover travel as an over-land or overwater hovercraft or an air-cushion vehicle (ACV) and is configured with blowers to produce a large volume of air below the hull that is slightly above atmospheric pressure. The propulsion system (engine) is configurable as a gas engine, a turbine engine, an electric motor and/or a hybrid gas/electric engine.

In some embodiments, the robot fleet is configured for air travel as an aerial drone or aerial hovercraft and is configured with wings, rotors, blowers, rockets, and/or propellers and an appropriate brake system. The propulsion system (engine) is configurable as a gas engine, a turbine engine, an electric motor and/or a hybrid gas/electric engine.

The Power System

In some embodiments, each robot of the robot fleet is configured with one or more power sources, which include the power system 135 (e.g., battery, solar, gasoline, propane, etc.).

Navigation Module

Each robot 101 in the fleet further includes a navigation module 140 for navigation in the unstructured open or closed environments (e.g., digital maps, HD maps, GPS, etc.). In some embodiments, the fleet 100 relies on maps generated by the user, operator, or fleet operator, specifically created to cover the intended environment where the robot 101 is configured to operate. These maps would then be used for general guidance of each robot 101 in the fleet, which would augment this understanding of the environment by using a variety of on-board sensors such as cameras, LiDAR, altimeters or radar to confirm its relative geographic position and elevation.

In some embodiments, for navigation, the fleet of robots 101 uses internal maps to provide information about where they are going and the structure of the road environment (e.g., lanes, etc.) and combine this information with onboard sensors (e.g., cameras, LiDAR, radar, ultrasound, microphones, etc.) and internal computer processing to constantly determine where they can safely navigate, what other objects are around each robot 101 and what they may do. In still other embodiments, the fleet incorporates on-line maps to augment internal maps. This information is then combined to determine a safe, robust trajectory for the robot 101 to follow and this is then executed by the low level actuators on the robot 101.

In some embodiments, the fleet relies on a global positioning system (GPS) that allows land, sea, and airborne users to determine their exact location, velocity, and time 24 hours a day, in all weather conditions, anywhere in the world.

In some embodiments, the fleet of robots 101 will use a combination of internal maps, sensors and GPS systems to confirm its relative geographic position and elevation.

In some embodiments, the autonomous fleet is strategically positioned throughout a geographic region in anticipation of a known demand.

Over time, a user 200 and/or a provider (vendor) 204 may anticipate demand for robot services by storing data concerning how many orders (and what type of orders) are made at particular times of day from different areas of the region. This can be done for both source (e.g., restaurants, grocery stores, general businesses, etc.) and destination (e.g., customer, other businesses, etc.). Then, for a specific current day and time, this stored data is used to determine what the optimal location of the fleet is given the expected demand. More concretely, the fleet can be positioned to be as close as possible to the expected source locations, anticipating these source locations will be the most likely new orders to come into the system. Even more concretely, it is possible to estimate the number of orders from each possible source in the next hour and weight each source location by this number. Then one can position the fleet so that the fleet optimally covers the weighted locations based on these numbers.

In some embodiments of the robot fleet, the positioning of robots 101 can be customized based on: anticipated use, a pattern of historical behaviors, or specific goods being carried.

Sensor Systems

As noted previously, each robot 101 is equipped with a sensor system 170, which includes at least a minimum number of onboard sensors (e.g., cameras (for example, those running at a high frame rate akin to video), LiDAR, radar, ultrasonic sensors, microphones, etc.) and internal computer processing 125 to constantly determine where it can safely navigate, what other objects are around each robot 101, and what it may do within its immediate surroundings.

In some embodiments, the robots 101 of the robot fleet further include conveyance system sensors 175 configured to: monitor drive mechanism performance (e.g., the propulsion engine); monitor power system levels 135 (e.g., battery, solar, gasoline, propane, etc.); or monitor drive train performance (e.g., transmission, tires, brakes, rotors, etc.).

Communications Module

Each robot 101 in the fleet 100 further includes a communication module 160 configurable to receive, store and send data to the fleet management module, to a user, to and from the fleet management module 120, and to and from the robots 101 in the fleet 100. In some embodiments, the data is related to at least user interactions and the robot fleet interactions, including, for example, scheduled requests or orders, on-demand requests or orders, or a need for self-positioning of the robot fleet based on anticipated demand within the unstructured open or closed environments.

In some embodiments, each robot 101 in the fleet includes at least one communication module configurable to receive, store and transmit data, and to store that data to a memory device, for future data transfer or manual download.

In some embodiments, each provider 204 and customer 202 may be provided with app/interface to communicate with the fleet operator 200 (e.g., "Nuro customer app" for customers on their phone, "Nuro vendor app" for businesses on a tablet or phone or their internal computer system, etc.).

In some embodiments, the communication to the user and the robots in the fleet, between the robots of the fleet, and between the user and the robots in the fleet, occurs via wireless transmission.

In some embodiments, the user's wireless transmission interactions and the robot fleet 100 wireless transmission interactions occur via mobile application transmitted by an electronic device and forwarded to the communication module via: a central server, a fleet management module, and/or a mesh network.

In some embodiments, one preferred method of communication is to use cellular communication between the fleet manager and fleet of robots, (e.g., 3G, 4G, 5G, or the like). Alternatively, the communication between the fleet control module and the robots could occur via satellite communication systems.

In some embodiments, a customer uses an app (either on a cellphone, laptop, tablet, computer or any interactive device) to request a service (e.g., an on-demand food order or for a mobile marketplace robot to come to them).

In some embodiments, the electronic device includes: a phone, a personal mobile device, a personal digital assistant (PDA), a mainframe computer, a desktop computer, a laptop computer, a tablet computer, and/or wearable computing device such as a communication headset, smart glasses, a contact lens or lenses, a digital watch, a bracelet, a ring, jewelry, or a combination thereof.

Return Logistics

Robots 101 in the fleet 100 are each configured for transporting, delivering or retrieving goods or services and are capable of operating in an unstructured open environment or closed environment. A customer 202 may make a request for a return of a merchandise through, e.g., a smartphone, a computer, tablet, or compatible computing device, a laptop, desktop, tablet, phablet, personal data assistant, or other similar computing devices, that communicate with the central server 110. The central server 110 is typically located at the fleet owner's or fleet manager's location and communicates with the fleet management module 120.

The customer 202 may request a desired pickup time and location at the time the request is made. For example, a default pickup location of the customer 202, such as home or office, may be set by the customer 202. In a case of a smartphone, a smartphone may include a global positioning system (GPS) that may be utilized for automatically determining a pickup location of the return merchandise. At the time of request, the customer 202 may also provide information on the merchandise being returned.

The central server 110 communicates the information from the user 202 with the fleet management module 120. The fleet management module 120 then relays the request to the appropriate provider 204 of the merchandise (e.g., vendor or retailer) and an appropriate robot or robots 101 in the fleet. The fleet management module 120 and the robot 101 may communicate with each other via a network, which may be a mesh network, wireless network, ad hoc network, Internet, or MANET. The provider 204 determines whether to approve the return request. For example, the provider 204 may determine that the product is ineligible for return due to the provider 204 policy prohibiting return of items such as, e.g., perishable foods or flammable goods, or due to expiration of return period. If the provider 204 accepts the request, the provider 204 sends the merchandise information to the fleet management module 120. The merchandise information may include, e.g., the weight and volume, of the merchandise. Based on the information, the fleet management module 120 may select the robot 101 with the adequate compartment space to receive the merchandise to be returned.

Upon receipt of the approval of the request from the provider 204 and the information on the merchandise, the fleet management module 120 communicates with the robots 101 to receive location information of the robots 101. Based on an optimized algorithm, the fleet management module 120 searches for a robot 101 that has sufficient compartment space to receive the merchandise to be returned and that can reach the customer 202 in the shortest amount time based on the location of the robot 101 and the customer 202 and road conditions such as traffic. For example, the fleet management module 120 may optimize routes to the location of the customer 202 from the location of the selected robot 101 and instruct the robot 101 to travel to the location of the customer 202 by following the optimized route. In another aspect, the fleet management module 120 may transmit to the selected autonomous vehicle the location of the customer 202, and the selected robot 101 may perform a search for an optimum route to the location of the customer 202 and autonomously drive to the location of the customer 202 by following the optimum route. As discussed hereinabove, the robots 1101 may be semi-autonomous. Alternatively, the robots 1101 may be controlled directly by a fleet operator. The fleet management module 120 assigns the return requests to a robot 101 and assigns a securable compartment for receipt of the returned merchandise.

Once the robot 101 reaches the location of the customer 202 or the pickup location, the customer 202 may access the return compartment of the robot 1101 after an authentication process. Upon arrival of the robot 101 at the pickup location, the customer 202 can then open the compartment(s) by verifying the customer's identity with the robot 101. This can be done through a wide variety of approaches comprising, but not limited to:

1. The customer can be given a PIN (e.g., 4 digit number) when they make their initial request/order. They can then enter this pin at the robot using the robot touchscreen or a keypad.
2. The customer can verify themselves using their mobile phone and an RFID reader on the robot.
3. The customer can verify themselves using their voice and a personal keyword or key phrase they speak to the robot.
4. The customer can verify themselves through their face, a government ID, or a business ID badge using cameras and facial recognition or magnetic readers on the robot.
5. The customer can verify themselves using their mobile phone; by pushing a button or predetermined code on their phone (and the system could optionally detect the customer is near the robot by using their GPS position from phone).

Figure 13:
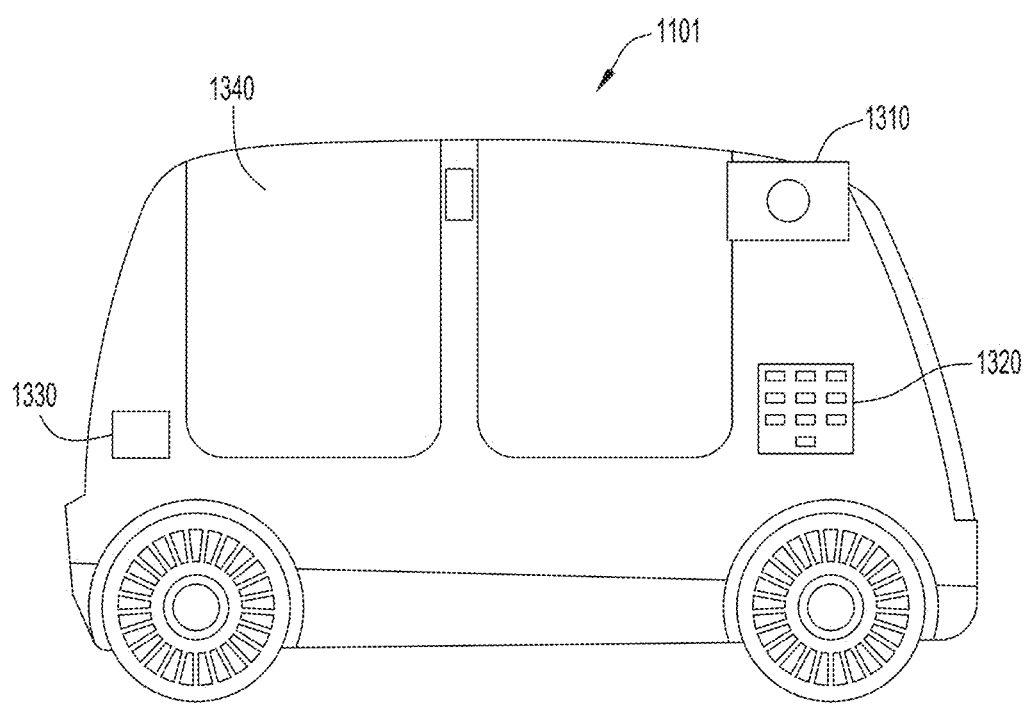
FIG. 13 is a side view of an autonomous vehicle in accordance with another embodiment of the present disclosure.

An interaction can include requesting the robot 101 to open its compartment 102, 104 through the customer's app or through a user interface on the robot 101 (using, e.g., RFID reader and customer phone, a touchpad, a keypad, voice commands, vision-based recognition of the person, etc.). For example, with respect to FIG. 13, a robot 1101 in accordance with an embodiment of the present disclosure may include an image capturing device 1310, a keypad 1320, and the scanner 1330. For example, the robot 1101 may take a picture of the customer 202 using the image capturing device 1310 and perform facial recognition. Alternatively, the image may be captured through a customer's smartphone. The customer 202 may use a code sent to the customer 202 via, e.g., a text message, a short message service (SMS), an email, or an image from the central server 110 after making the return request, to access the robot 1101. The customer 202 may enter the code via the keypad 1320. The customer 202 may also be authenticated by the scanner 1330 using biometrics such as, e.g., fingerprint, vein configuration, voice patterns, and hand geometry. Upon verification of the identity of the customer 202, the customer 202 may access a compartment 1340 of the robot 1101 to place a merchandise to be returned therein. Optionally, the merchandise to be returned may be verified by the robot 1101 by scanning, e.g., a barcode, of the merchandise to be returned using a barcode reader 1330 or a camera. Alternatively, a scale may be utilized alone or in combination with the barcode reader 1330 or the camera, to verify the weight of the merchandise to be returned before acceptance.

Upon successful receipt of the merchandise from the customer 202, the robot 1101 confirms the receipt with the fleet management module 120. Thereafter, the robot 1101 is directed to, e.g., a warehouse, of the provider 204 or a third-party to unload the returned merchandise or is reassigned for another pickup based on the availability of vacant compartment 1340.

Figure 14:
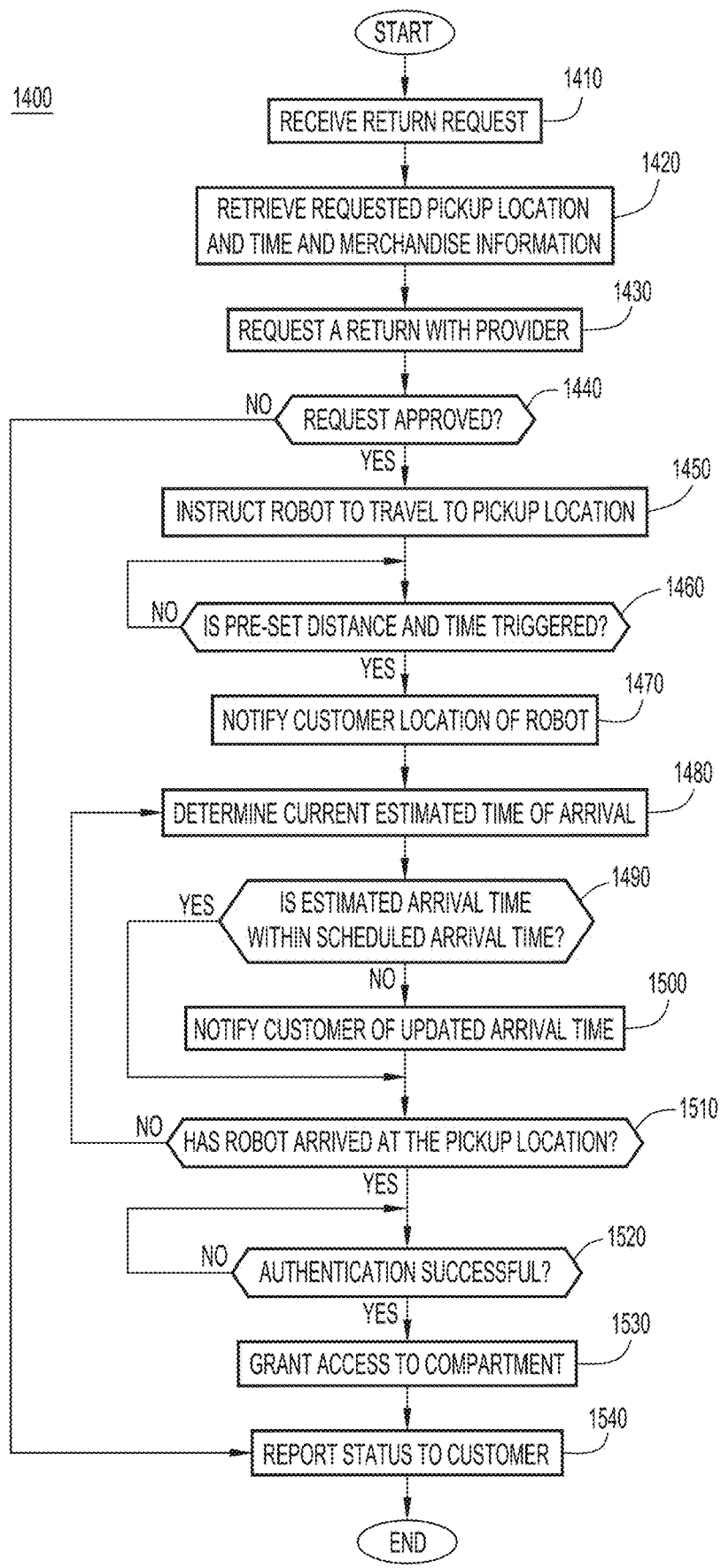
FIG. 14 is an exemplary flowchart representation illustrative of a high level method for providing return of a merchandise via an autonomous vehicle.

With reference to FIG. 14, there is shown a flow diagram of a method 1400 for returning a merchandise via a robot 1101 in accordance with an embodiment of the present disclosure. Persons skilled in the art will appreciate that one or more operations of the method 1400 may be performed in a different order, repeated, and/or omitted without departing from the scope of the present disclosure. In various embodiments, the illustrated method 1400 can operate in the central server 110 (FIG. 11), in the fleet management module 120 (FIG. 11), or in another server or system. In various embodiments, some or all of the operations in the illustrated method 1400 can operate in the robot 101, such as using the components of FIG. 12. Other variations are contemplated to be within the scope of the present disclosure.

Initially in step 1410, a merchandise return request is received from a customer 202. In step 1420, the desired location and time of pickup, as well as information about the merchandise including, e.g., weight and volume, is retrieved. Alternatively, if the customer 202 does not indicate time and location, the location of the customer via the smartphone GPS or the pre-set default location is retrieved. In step 1430, the fleet management module 120 communicates return request with the provider 204. In step 1440, if the provider 204 approves the return request, the fleet management module 120 assigns and instructs a robot 1101 having a securable compartment to travel to the pickup location. If the provider 204 rejects the return request, the fleet management module 120 communicates the denial status of the return to the customer 202. Optionally, in step 1460, the customer 202 may set a notification that is triggered once the robot 1101 reaches a pre-set distance or remaining time from the pickup location. For example, if the robot 1101 is within 5 mile radius of the pickup location, or within 15 minutes of arrival time based on the current road conditions, the customer 202 may receive a notification via, e.g., e-mail, text, SMS, or an app on a smartphone. In step 1470, if the robot 1101 is within the pre-set threshold, a notification is sent to the customer 202. If the robot 1101 is outside of the pre-determined threshold, step 1460 is repeated.

In step 1480, based on the road conditions and also the condition of the robot 1101, the fleet management module 120 determines an estimated time of arrival of the robot 1101. In step 1490, the estimated time of arrival is outside the scheduled arrival time, an updated estimated arrival time may be sent to the customer 202 via, e.g., e-mail, text, SMS, or an app of a smartphone. In step 1510, the fleet management module 120 determines whether or not the robot 1101 has arrived at the pickup location. If it is determined that the robot 1101 has arrived at the pickup location in step 1510, the system uses a customer identification reader at the pickup location to capture a customer identification object in step 1520. For example, the customer identification reader may include the image capturing device 1310. The customer identification object may be saved from past interactions with the robot 101, and the system may compare the customer identification object with the previously saved interaction. In an embodiment, facial recognition may be used to verify that the captured customer identification object matches an identity of the particular individual Alternatively, the keypad 1320 may be utilized by the customer 202 to input access code and/or the scanner 1330 may be utilized to scan, e.g., barcode, generated by an app on a smartphone.

Optionally, the merchandise to be returned may be verified by the robot 1101 by scanning, e.g., a barcode, of the merchandise to be returned using a barcode reader 1330 or a camera. Alternatively, a scale may be utilized alone or in combination with the barcode reader 1330 or the camera, to verify the weight of the merchandise to be returned before acceptance.

In step 1520, the system determines if the authentication process has been successful. If successful, access to the secured compartment of the robot 1101 is granted to the customer 202. If unsuccessful, the system would not instruct the robot 101 to unlock. If the authentication process is unsuccessful, step 1520 is repeated for a pre-determined number of times, after which, the system may freeze the authentication process for a pre-determined amount of time to deter tampering by an unauthorized user. Alternatively, the customer 202 may gain access to the secured compartment by scanning, e.g., a barcode, of the merchandise to be returned, using the scanner 1330 or a camera. In step 1530, once the customer 202 gains access to a particular compartment, the customer 202 may place the merchandise in the compartment and secure the compartment.

In step 1540, once the robot 1101 successfully receives the return merchandise, the system reports to the customer 202 the status of the return and instructs the robot 1101 to travel to a warehouse to unload the merchandise or to another pickup location.

Figure 15:
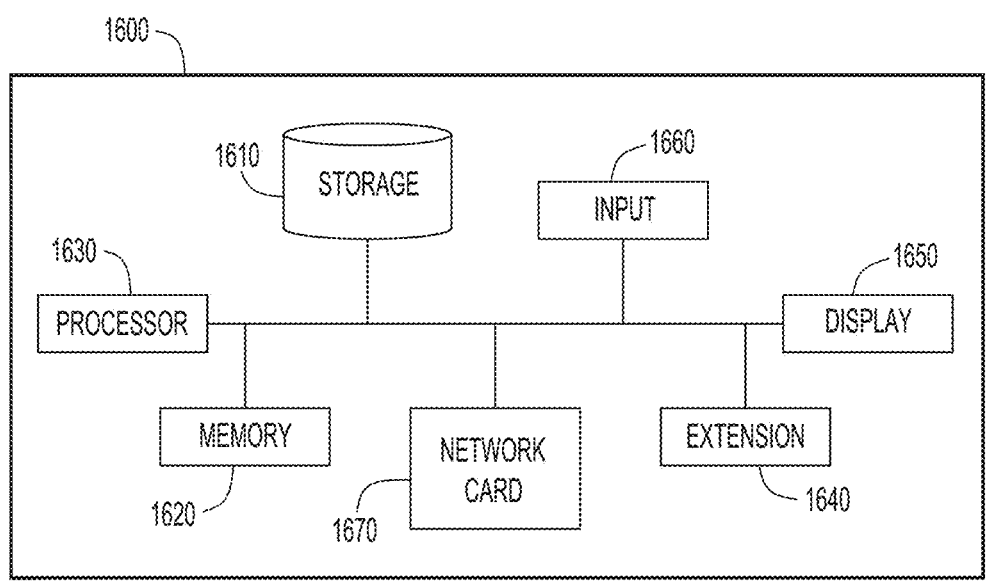
FIG. 15 is an exemplary block diagram representation illustrative of various modules.

FIG. 15 is a block diagram for a computing device 1600 representative of the managing server or controller of the robot fleet 100 of FIG. 1, the smartphone device, or a controller of the robot 1101. The computing device 1600 may include a storage 1610, memory 1620, processor 1630, extension 1640, display device 1650, input device 1660, and network card 1670. The storage 1610 stores data to be accessed for reading and editing programs to be executed. The memory 1620 may include a random access memory (RAM) and a read-only memory (ROM). The ROM generally stores booting programs that run when the computing device is turned on and the RAM is used for fast performance, i.e., loading a program and/or calculating data.

The processor 1630 executes instructions which implement tasks or functions of programs. When a user executes a program, the processor 1630 reads the program stored in the storage 1610, loads the program on the RAM, and executes instructions prescribed by the program. A user may input and/or modify data via the input device 1660 that may include a keyboard, a mouse, or any other device with which the use may input data. The display device 1650 displays data on a screen of the display device 1650. The display device 1650 may be a touch screen so that the display device 1650 can be used as an input device.

The extension 1640 may include several ports, such as one or more universal serial buses (USBs), IEEE 1394 ports, parallel ports, and/or expansion slots such as peripheral component interconnect (PCI) and PCI express (PCIe). The extension 1640 is not limited to the list but may include other slots or ports that can be used for appropriate purposes. The extension 1640 may be used to install hardware or add additional functionalities to a computer that may facilitate the purposes of the computer. For example, a USB port can be used for adding a storage to the computer and/or an IEEE 1394 may be used for receiving moving/still image data.

The network card 1670 is used to communicate with the robot 101 or mobile devices, wirelessly or via a wired connection. Through the network card 1670, the robot 101 or mobile devices may receive, modify, and/or update from and to the managing server.

Controller(s) and Processor(s)

In some embodiments, each robot in the robot fleet 100 is equipped with one or more processors 125 capable of both high-level computing for processing as well as low-level safety-critical computing capacity for controlling the hardware. The at least one processor is configured to manage the conveyance system, the navigation module, the sensor system, instructions from the fleet management module, the communication module and the controller.

Further still, in some embodiments, each robot in the robot fleet 100 is equipped with a controller 150 configurable to associate each one of the securable compartments 102, 104 to an assignable customer 202 or provider 204 and provide entry when authorized.

Additional Features

In some embodiments, the robot fleet 100 further includes at least one robot having a digital display for curated content comprising: advertisements (i.e., for both specific user and general public), including services provided, marketing/promotion, regional/location of areas served, customer details, local environment, lost, sought or detected people, public service announcements, date, time, or weather.

The phrases "in an embodiment," "in embodiments," "in various embodiments," "in some embodiments," or "in other embodiments" may each refer to one or more of the same or different embodiments in accordance with the present disclosure. A phrase in the form "A or B" means "(A), (B), or (A and B)." A phrase in the form "at least one of A, B, or C" means "(A); (B); (C); (A and B); (A and C); (B and C); or (A, B, and C)."

Any of the herein described methods, programs, algorithms or codes may be converted to, or expressed in, a programming language or computer program. The terms "programming language" and "computer program," as used herein, each include any language used to specify instructions to a computer, and include (but is not limited to) the following languages and their derivatives: Assembler, Basic, Batch files, BCPL, C, C+, C++, Delphi, Fortran, Java, JavaScript, machine code, operating system command languages, Pascal, Perl, PL1, Python, scripting languages, Visual Basic, metalanguages which themselves specify programs, and all first, second, third, fourth, fifth, or further generation computer languages. Also included are database and other data schemas, and any other meta-languages. No distinction is made between languages which are interpreted, compiled, or use both compiled and interpreted approaches. No distinction is made between compiled and source versions of a program. Thus, reference to a program, where the programming language could exist in more than one state (such as source, compiled, object, or linked) is a reference to any and all such states. Reference to a program may encompass the actual instructions and/or the intent of those instructions.

The systems described herein may also utilize one or more controllers to receive various information and transform the received information to generate an output. The controller may include any type of computing device, computational circuit, or any type of processor or processing circuit capable of executing a series of instructions that are stored in a memory. The controller may include multiple processors and/or multicore central processing units (CPUs) and may include any type of processor, such as a microprocessor, digital signal processor, microcontroller, programmable logic device (PLD), field programmable gate array (FPGA), or the like. The controller may also include a memory to store data and/or instructions that, when executed by the one or more processors, cause the one or more processors to perform one or more methods and/or algorithms.

The embodiments disclosed herein are examples of the disclosure and may be embodied in various forms. For instance, although certain embodiments herein are described as separate embodiments, each of the embodiments herein may be combined with one or more of the other embodiments herein. Specific structural and functional details disclosed herein are not to be interpreted as limiting, but as a basis for the claims and as a representative basis for teaching one skilled in the art to variously employ the present disclosure in virtually any appropriately detailed structure. Like reference numerals may refer to similar or identical elements throughout the description of the figures.

It should be understood that the foregoing description is only illustrative of the present disclosure. Various alternatives and modifications can be devised by those skilled in the art without departing from the disclosure. Accordingly, the present disclosure is intended to embrace all such alternatives, modifications and variances. The embodiments described with reference to the attached drawing figures are presented only to demonstrate certain examples of the disclosure. Other elements, steps, methods, and techniques that are insubstantially different from those described above and/or in the appended claims are also intended to be within the scope of the disclosure.

What is claimed:

1. An autonomous robotic vehicle comprising:
   a conveyance system;
   a securable compartment configured to autonomously lock and unlock;
   a product identification reader that includes a scale;
   at least one processor; and
   a memory storing instructions which, when executed by the at least one processor, causes the autonomous robotic vehicle to, autonomously:
      travel to a pickup location of a customer in response to receiving an instruction to retrieve a product comprising return merchandise that has been approved for a merchandise return by the customer to a product provider;
      obtain, at the pickup location, a weight of an item from the customer, captured by the scale;
      determine, at the pickup location, based on the weight captured by the scale, whether the item from the customer is the return merchandise that has been approved for the merchandise return by the product provider by verifying that the weight captured by the scale matches a weight value included in merchandise information provided with an approval of a return by the product provider; and
      accept, at the pickup location, the item so as to be locked into the securable compartment for transport to the product provider for processing of the merchandise return at a product provider location only if it is determined that the item is the product.

2. The autonomous robotic vehicle according to claim 1, further comprising a customer identification reader, wherein the memory storing instructions which, when executed by the at least one processor, further causes the autonomous robotic vehicle to:
   determine, at the pickup location, based on information captured by the customer identification reader, whether an identity of the customer is verified, and
   unlock the securable compartment to permit receipt of the item in the securable compartment only in response to determining that the identity of the customer is verified.

3. The autonomous robotic vehicle according to claim 1, further comprising a bar code reader that captures a bar code of the item, wherein the memory storing instructions which, when executed by the at least one processor, further causes the autonomous robotic vehicle to:
   verify that the item is the return merchandise based on information from the bar code.

4. The autonomous robotic vehicle according to claim 1, further comprising a camera capturing an image of the item, wherein the memory storing instructions which, when executed by the at least one processor, further causes the autonomous robotic vehicle to:
   verify that the item is the return merchandise based on information from the image of the item.

5. The autonomous robotic vehicle according to claim 1, wherein the memory storing instructions which, when executed by the at least one processor, causes the autonomous robotic vehicle to, after accepting the item, transport the item to the product provider location.

6. The autonomous robotic vehicle according to claim 1, wherein the memory storing instructions which, when executed by the at least one processor, causes the autonomous robotic vehicle to determine a distance between a location of the autonomous robotic vehicle and the pickup location of the customer.

7. The autonomous robotic vehicle according to claim 6, wherein the memory storing instructions which, when executed by the at least one processor, causes the autonomous robotic vehicle to send a notification to the customer if the distance is less than a pre-set distance.

8. The autonomous robotic vehicle according to claim 1, wherein the memory storing instructions which, when executed by the at least one processor, causes the autonomous robotic vehicle to estimate a time of arrival at the pickup location of the customer.

9. The autonomous robotic vehicle according to claim 8, wherein the memory storing instructions which, when executed by the at least one processor, causes the autonomous robotic vehicle to send a notification to the customer if the time of arrival is later than a schedule arrival time.

10. The autonomous robotic vehicle according to claim 1, wherein the product identification reader further includes at least one of a camera or a barcode reader.

11. The autonomous robotic vehicle according to claim 1, wherein the securable compartment is one of a plurality of securable compartments of the autonomous robotic vehicle,
wherein the instruction to retrieve the product includes an assignment of the securable compartment, and
wherein the assignment is based on at least a size of the product.

12. The autonomous robotic vehicle of claim 1, further comprising:
a barcode reader or a camera that captures item information for verifying that the item is the return merchandise that has been approved for the merchandise return.

13. The autonomous robotic vehicle of claim 1, wherein the merchandise information further includes a volume of the return merchandise based on which the securable compartment of a plurality of securable compartments is assigned for the return merchandise.

14. An autonomous delivery management system comprising:
at least one processor; and
a memory storing instructions which, when executed by the at least one processor, causes the autonomous delivery management system to:
determine whether to approve a request for a product comprising return merchandise to be processed as a merchandise return from a customer to a product provider; and
in response to determining to approve the request:
select one of a plurality of autonomous robotic vehicles to retrieve the product from the customer at a pickup location of the customer,
instruct the one of the plurality of autonomous robotic vehicles to travel to the pickup location to retrieve the return merchandise that has been approved for the merchandise return by the product provider, from the customer, and
lock an item in one of a plurality of securable compartments of the one of the plurality of autonomous robotic vehicles, at the pickup location, for transport from the pickup location to a product provider location for processing of the merchandise return, only if it is verified via the one of the plurality of autonomous robotic vehicles, at the pickup location, that the item, which is presented by the customer at the pickup location, is the product, wherein the item is determined to be the return merchandise that has been approved for the merchandise return by the product provider based on a weight of the item captured by a scale of the one of the plurality of autonomous robotic vehicles and compared to a weight value included in merchandise information provided with an approval of a return by the product provider.

15. The autonomous delivery management system according to claim 14, wherein the memory storing instructions which, when executed by the at least one processor, causes the autonomous delivery management system to communicate instructions to the one of the plurality of autonomous robotic vehicles to unlock the one of the plurality of securable compartments, to permit receipt of the item from the customer in the one of the plurality of securable compartments, upon a verification via the one of the plurality of autonomous robotic vehicles of an identity of the customer.

16. The autonomous delivery management system according to claim 14, wherein the memory storing instructions which, when executed by the at least one processor, causes the autonomous delivery management system to receive, from a device of the customer, an identification object captured by the device, and a location of the device.

17. The autonomous delivery management system according to claim 16, wherein the memory storing instructions which, when executed by the at least one processor, causes the autonomous delivery management system to determine that the identification object captured by the device matches an identity of the customer.

18. The autonomous delivery management system according to claim 14, wherein the memory storing instructions which, when executed by the at least one processor, causes the autonomous delivery management system to receive, from a device of the customer, a pickup time and the pickup location.

19. The autonomous delivery management system according to claim 14, wherein the memory storing instructions which, when executed by the at least one processor, causes the autonomous delivery management system to select the one of the plurality of autonomous robotic vehicles based on at least a location of the one of the plurality of autonomous robotic vehicles relative to the pickup location.

20. The autonomous delivery management system according to claim 14, wherein the memory storing instructions which, when executed by the at least one processor, causes the autonomous delivery management system to select the one of the plurality of autonomous robotic vehicles based on at least an amount of available compartment space in the one of the plurality of autonomous robotic vehicles.

21. The autonomous delivery management system according to claim 14, wherein the memory storing instructions which, when executed by the at least one processor, causes the autonomous delivery management system to select the one of the plurality of securable compartments based on at least an amount of available compartment space in the one of the plurality of securable compartments.

22. The autonomous delivery management system according to claim 14, wherein the memory storing instructions which, when executed by the at least one processor, causes the autonomous delivery management system to determine whether to approve the request based on a return policy of the product provider.

23. A method, comprising:
receiving, at an autonomous robotic vehicle, an instruction to travel to a pickup location of a customer to retrieve a product comprising return merchandise that has been approved for a merchandise return by the customer to a product provider at a product provider location;
travelling, by the autonomous robotic vehicle, to the pickup location;
obtaining, at the pickup location, a weight of an item from the customer, captured by a scale of the autonomous robotic vehicle;
determining, by the autonomous robotic vehicle, at the pickup location, whether the item presented by the customer is the return merchandise that has been approved for the merchandise return by the product provider, based on comparing the weight of the item with a weight value included in merchandise information provided with an approval of a return by the product provider; and
accepting, by the autonomous robotic vehicle, at the pickup location, the item for the return to the product provider for processing of the merchandise return only if it is determined that the item presented by the customer is the product, wherein accepting comprises locking, by the autonomous robotic vehicle, the item in a securable compartment of the autonomous robotic vehicle.

24. The method of claim 23, further comprising:
scanning a barcode of the item by a product identification reader of the autonomous robotic vehicle.

25. The method of claim 23, further comprising:
determining, by the autonomous robotic vehicle, at the pickup location, whether an identity of the customer is verified; and
unlocking the securable compartment assigned for the return merchandise from among at least two compartments, to receive the item in the securable compartment, in response to determining that the identity of the customer is verified.

26. The method of claim 23, wherein receiving the instruction comprises receiving an assignment of the securable compartment from among a plurality of securable compartments, wherein the plurality of securable compartments of the autonomous robotic vehicle are configured to lock and unlock independently of one another.

27. The method of claim 26, wherein the assignment is based on at least a size of the product.

28. The method of claim 23, further comprising transporting, by the autonomous robotic vehicle, the item to a location of the product provider.

* * * * *